United States Patent
Yasu et al.

(10) Patent No.: US 12,162,546 B2
(45) Date of Patent: Dec. 10, 2024

(54) ELECTRONIC CONTROL DEVICE, ELECTRIC POWER STEERING DEVICE, AND CONTROL DEVICE FOR ELECTRIC POWER STEERING DEVICE

(71) Applicant: HITACHI ASTEMO, LTD., Hitachinaka (JP)

(72) Inventors: Keita Yasu, Hitachinaka (JP); Kazuya Yamano, Hitachinaka (JP); Atsushi Matsuoka, Hitachinaka (JP); Makoto Goto, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 91 days.

(21) Appl. No.: 17/795,437

(22) PCT Filed: Feb. 3, 2021

(86) PCT No.: PCT/JP2021/003930
§ 371 (c)(1),
(2) Date: Jul. 26, 2022

(87) PCT Pub. No.: WO2021/166648
PCT Pub. Date: Aug. 26, 2021

(65) Prior Publication Data
US 2023/0050144 A1 Feb. 16, 2023

(30) Foreign Application Priority Data
Feb. 18, 2020 (JP) .................................. 2020-024968

(51) Int. Cl.
*B62D 6/00* (2006.01)
*B60W 50/02* (2012.01)
(Continued)

(52) U.S. Cl.
CPC .............. *B62D 6/00* (2013.01); *B60W 50/02* (2013.01); *B60W 50/023* (2013.01);
(Continued)

(58) Field of Classification Search
CPC ........ B62D 6/10; B62D 5/0481; B62D 5/049; B60W 50/02; B60W 50/0205;
(Continued)

(56) References Cited

U.S. PATENT DOCUMENTS

2009/0319120 A1* 12/2009 Hatanaka ........... B62D 15/0215
701/29.2
2017/0267278 A1* 9/2017 Uryu .................... B62D 5/0484
(Continued)

FOREIGN PATENT DOCUMENTS

JP        2019-119417 A    7/2019
WO   WO-2016/042607 A1    3/2016
(Continued)

OTHER PUBLICATIONS

International Search Report dated Apr. 20, 2021 issued in International Application No. PCT/JP2021/003930, with English translation, 5 pages.
(Continued)

*Primary Examiner* — Russell Frejd
*Assistant Examiner* — Sara J Lewandroski
(74) *Attorney, Agent, or Firm* — FOLEY & LARDNER LLP

(57) ABSTRACT

A control device of an electric power steering device includes an arithmetic processing device having a comparison unit, a failure diagnosis unit, and a drive control unit. The comparison unit compares a difference between a first output signal output from a first sensor and a second output signal output from a second sensor with a first threshold value to determine a magnitude relationship, and compares
(Continued)

a difference between the first output signal and a third output signal output from a third sensor with a second threshold value to determine a magnitude relationship. Based on a result of the comparison unit, the failure diagnosis unit identifies one abnormal sensor among the first, second and third sensor. Using output values from two normal sensors that are not identified as abnormal sensors among the first, second and third sensor, the drive control unit generates a drive control signal for driving an electric motor.

16 Claims, 17 Drawing Sheets

(51) Int. Cl.
    *B60W 50/023*     (2012.01)
    *B60W 50/029*     (2012.01)
    *B62D 5/04*     (2006.01)

(52) U.S. Cl.
    CPC ......... *B60W 50/029* (2013.01); *B62D 5/0484* (2013.01); *B60W 2050/0215* (2013.01); *B60W 2050/0292* (2013.01)

(58) Field of Classification Search
    CPC ........... B60W 50/0225; B60W 50/023; B60W 50/029; B60W 2050/021; B60W 2050/0215; B60W 2050/0292; B60W 2050/0295

See application file for complete search history.

(56) References Cited

U.S. PATENT DOCUMENTS

| | | |
|---|---|---|
| 2019/0210637 A1 | 7/2019 | Otake et al. |
| 2020/0010094 A1 | 1/2020 | Nakada |
| 2020/0180689 A1 | 6/2020 | Asaka |
| 2020/0207408 A1* | 7/2020 | Nakamura ............. B62D 5/049 |

FOREIGN PATENT DOCUMENTS

| | | |
|---|---|---|
| WO | WO-2018/008628 A1 | 1/2018 |
| WO | WO-2018/173561 A1 | 9/2018 |

OTHER PUBLICATIONS

International Preliminary Report on Patentability dated Aug. 23, 2022 issued in International Application No. PCT/JP2021/003930, with English translation, 10 pages.

* cited by examiner

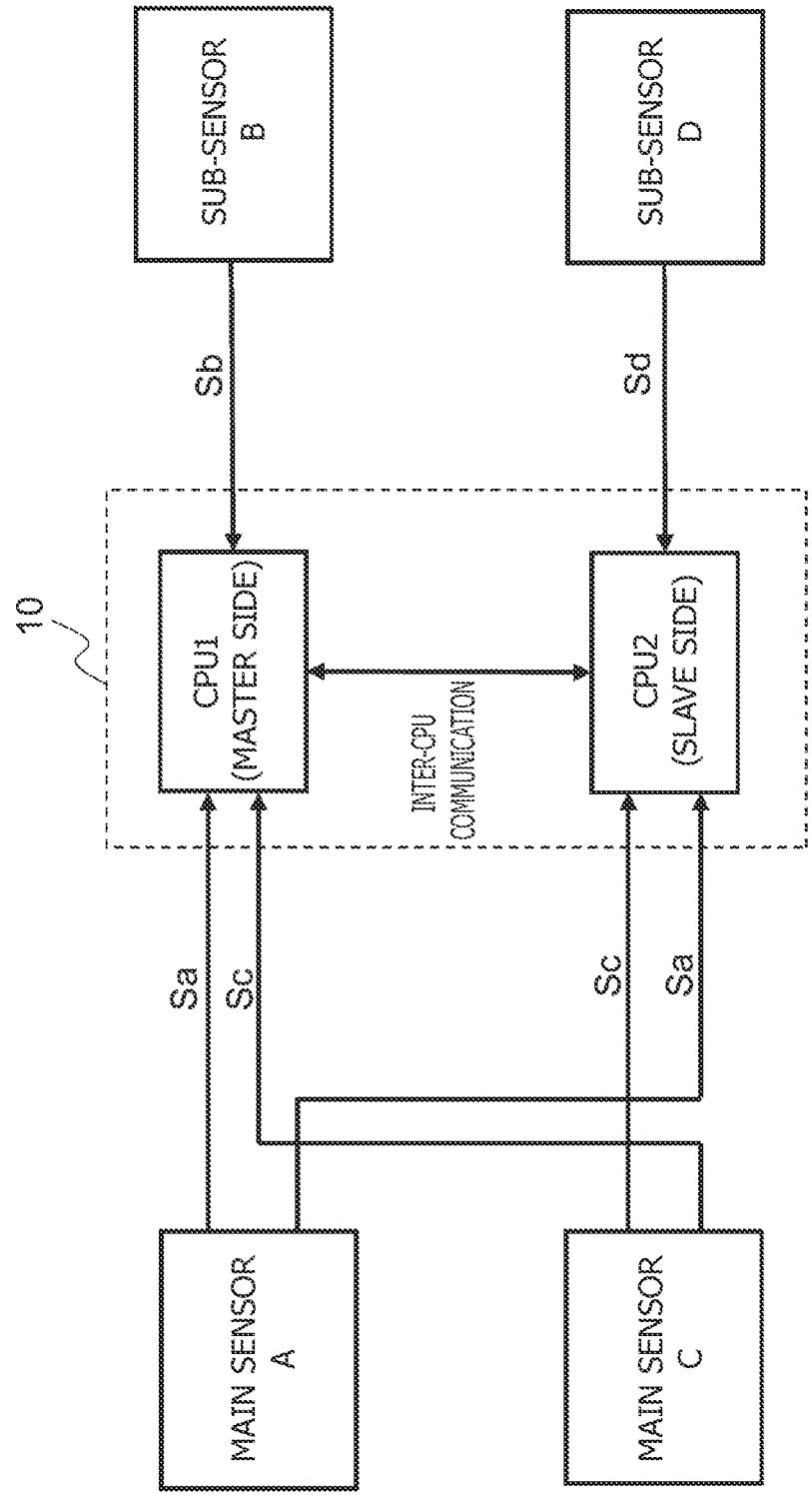

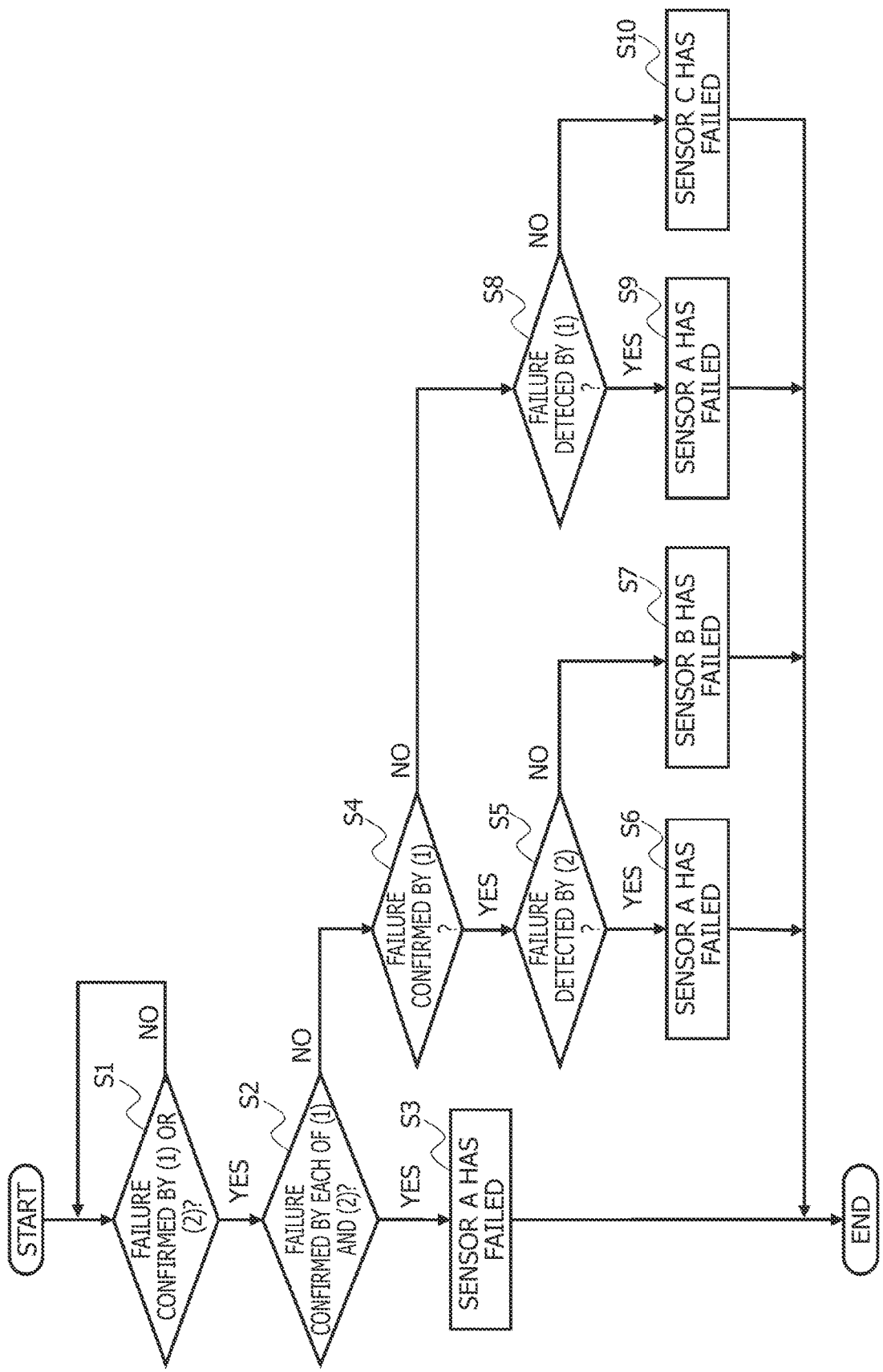

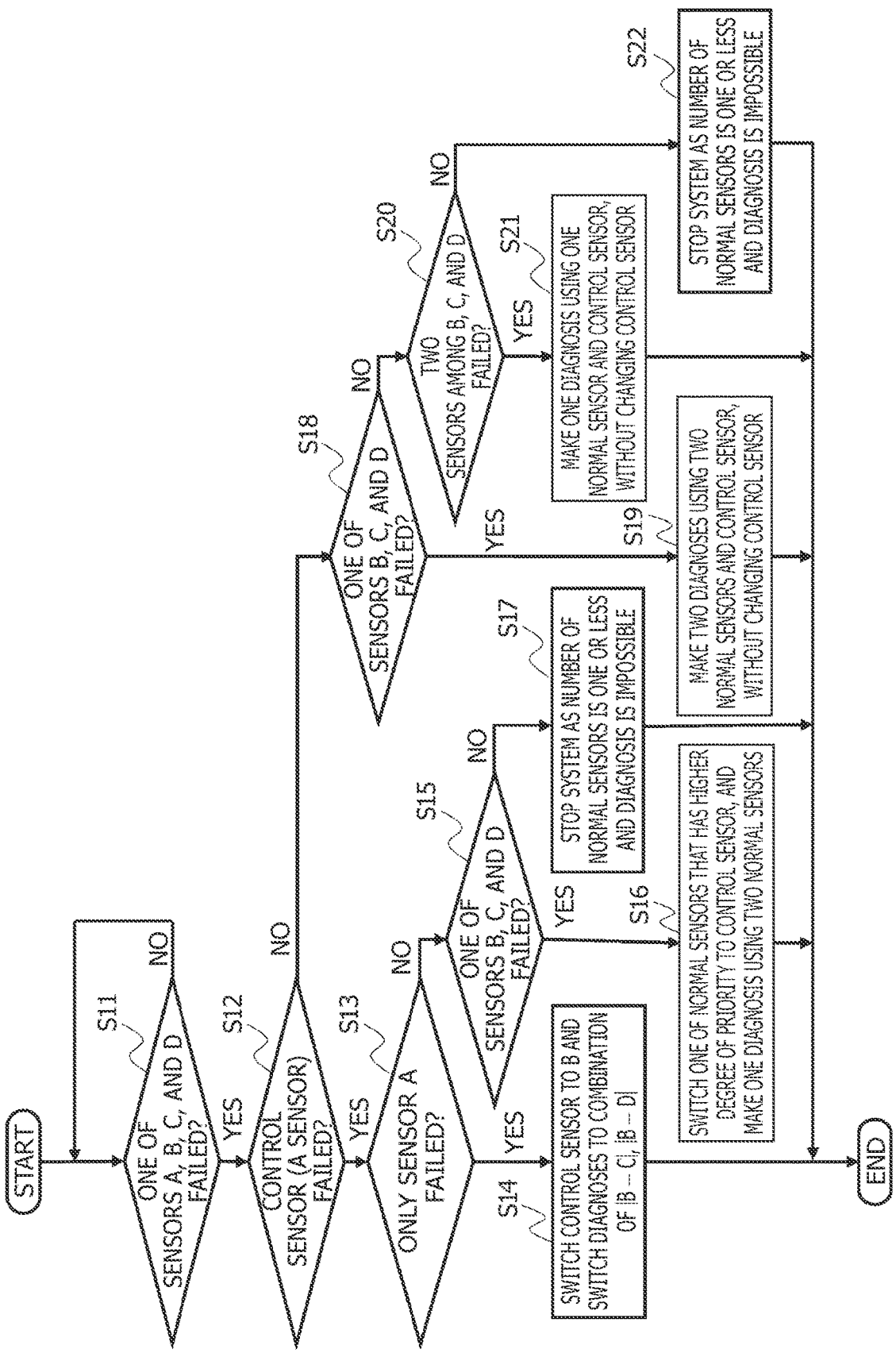

FIG.4 WHEN FAILURE HAS NOT YET OCCURRED

|   | DIAGNOSIS(1) A-B | DIAGNOSIS(2) A-C | SENSOR CONFIRMED AS FAILED | CONTROL SENSOR BEFORE FAILURE | CONTROL SENSOR AFTER FAILURE |
|---|---|---|---|---|---|
| #1 | NOT DETECTED | NOT DETECTED | - | A | A |
| #2 | CONFIRMED | NOT DETECTED | B | A | A |
| #3 | NOT DETECTED | CONFIRMED | C | A | A |
| #4 | CONFIRMED | DETECTED | A | A | B |
| #5 | DETECTED | CONFIRMED | A | A | B |
| #6 | CONFIRMED | CONFIRMED | A | A | B |

FIG.5 PRIMARY FAILURE: SENSOR A

|   | DIAGNOSIS(1) B-C | DIAGNOSIS(2) B-D | SENSOR CONFIRMED AS FAILED | CONTROL SENSOR BEFORE FAILURE | CONTROL SENSOR AFTER FAILURE |
|---|---|---|---|---|---|
| #1 | NOT DETECTED | NOT DETECTED | - | B | B |
| #2 | CONFIRMED | NOT DETECTED | C | B | B |
| #3 | NOT DETECTED | CONFIRMED | D | B | B |
| #4 | CONFIRMED | DETECTED | B | B | C |
| #5 | DETECTED | CONFIRMED | B | B | C |
| #6 | CONFIRMED | CONFIRMED | B | B | C |

FIG.6 PRIMARY FAILURE: SENSOR B

|   | DIAGNOSIS(1) A-C | DIAGNOSIS(2) A-D | SENSOR CONFIRMED AS FAILED | CONTROL SENSOR BEFORE FAILURE | CONTROL SENSOR AFTER FAILURE |
|---|---|---|---|---|---|
| #1 | NOT DETECTED | NOT DETECTED | - | A | A |
| #2 | CONFIRMED | NOT DETECTED | C | A | A |
| #3 | NOT DETECTED | CONFIRMED | D | A | A |
| #4 | CONFIRMED | DETECTED | A | A | C |
| #5 | DETECTED | CONFIRMED | A | A | C |
| #6 | CONFIRMED | CONFIRMED | A | A | C |

FIG.7 PRIMARY FAILURE: SENSOR C

|     | DIAGNOSIS(1) A-B | DIAGNOSIS(2) A-D | SENSOR CONFIRMED AS FAILED | CONTROL SENSOR BEFORE FAILURE | CONTROL SENSOR AFTER FAILURE |
|-----|------------------|------------------|----------------------------|-------------------------------|------------------------------|
| #1  | NOT DETECTED     | NOT DETECTED     | -                          | A                             | A                            |
| #2  | CONFIRMED        | NOT DETECTED     | B                          | A                             | A                            |
| #3  | NOT DETECTED     | CONFIRMED        | D                          | A                             | A                            |
| #4  | CONFIRMED        | DETECTED         | A                          | A                             | B                            |
| #5  | DETECTED         | CONFIRMED        | A                          | A                             | B                            |
| #6  | CONFIRMED        | CONFIRMED        | A                          | A                             | B                            |

FIG.8 PRIMARY FAILURE: SENSOR D (NO SWITCHING OCCURS)

|     | DIAGNOSIS(1) A-B | DIAGNOSIS(2) A-C | SENSOR CONFIRMED AS FAILED | CONTROL SENSOR BEFORE FAILURE | CONTROL SENSOR AFTER FAILURE |
|-----|------------------|------------------|----------------------------|-------------------------------|------------------------------|
| #1  | NOT DETECTED     | NOT DETECTED     | -                          | A                             | A                            |
| #2  | CONFIRMED        | NOT DETECTED     | B                          | A                             | A                            |
| #3  | NOT DETECTED     | CONFIRMED        | C                          | A                             | A                            |
| #4  | CONFIRMED        | DETECTED         | A                          | A                             | B                            |
| #5  | DETECTED         | CONFIRMED        | A                          | A                             | B                            |
| #6  | CONFIRMED        | CONFIRMED        | A                          | A                             | B                            |

FIG.9 PRIMARY FAILURE: SENSOR A, SECONDARY FAILURE: SENSOR B
PRIMARY FAILURE: SENSOR B, SECONDARY FAILURE: SENSOR A

|     | DIAGNOSIS(1) C-D | -   | SENSOR CONFIRMED AS FAILED | CONTROL SENSOR BEFORE FAILURE | CONTROL SENSOR AFTER FAILURE |
|-----|------------------|-----|----------------------------|-------------------------------|------------------------------|
| #1  | NOT DETECTED     | -   | -                          | C                             | -                            |
| #2  | CONFIRMED        | -   | C                          | C                             | -                            |

FIG.10 PRIMARY FAILURE: SENSOR A, SECONDARY FAILURE: SENSOR C
PRIMARY FAILURE: SENSOR C, SECONDARY FAILURE: SENSOR A

|     | DIAGNOSIS(1) B-D | -   | SENSOR CONFIRMED AS FAILED | CONTROL SENSOR BEFORE FAILURE | CONTROL SENSOR AFTER FAILURE |
|-----|------------------|-----|----------------------------|-------------------------------|------------------------------|
| #1  | NOT DETECTED     | -   | -                          | B                             | -                            |
| #2  | CONFIRMED        | -   | B                          | B                             | -                            |

FIG.11 PRIMARY FAILURE: SENSOR A, SECONDARY FAILURE: SENSOR D
PRIMARY FAILURE: SENSOR D, SECONDARY FAILURE: SENSOR A

|  | DIAGNOSIS(1) B-C | - | SENSOR CONFIRMED AS FAILED | CONTROL SENSOR BEFORE FAILURE | CONTROL SENSOR AFTER FAILURE |
|---|---|---|---|---|---|
| #1 | NOT DETECTED | - | - | B | - |
| #2 | CONFIRMED | - | B | B | - |

FIG.12 PRIMARY FAILURE: SENSOR B, SECONDARY FAILURE: SENSOR C
PRIMARY FAILURE: SENSOR C, SECONDARY FAILURE: SENSOR B

|  | DIAGNOSIS(1) A-D | - | SENSOR CONFIRMED AS FAILED | CONTROL SENSOR BEFORE FAILURE | CONTROL SENSOR AFTER FAILURE |
|---|---|---|---|---|---|
| #1 | NOT DETECTED | - | - | A | - |
| #2 | CONFIRMED | - | A | A | - |

FIG.13 PRIMARY FAILURE: SENSOR B, SECONDARY FAILURE: SENSOR D
PRIMARY FAILURE: SENSOR D, SECONDARY FAILURE: SENSOR B

|  | DIAGNOSIS(1) A-C | - | SENSOR CONFIRMED AS FAILED | CONTROL SENSOR BEFORE FAILURE | CONTROL SENSOR AFTER FAILURE |
|---|---|---|---|---|---|
| #1 | NOT DETECTED | - | - | A | - |
| #2 | CONFIRMED | - | A | A | - |

FIG.14 PRIMARY FAILURE: SENSOR C, SECONDARY FAILURE: SENSOR D
PRIMARY FAILURE: SENSOR D, SECONDARY FAILURE: SENSOR C

|  | DIAGNOSIS(1) A-B | - | SENSOR CONFIRMED AS FAILED | CONTROL SENSOR BEFORE FAILURE | CONTROL SENSOR AFTER FAILURE |
|---|---|---|---|---|---|
| #1 | NOT DETECTED | - | - | A | - |
| #2 | CONFIRMED | - | A | A | - |

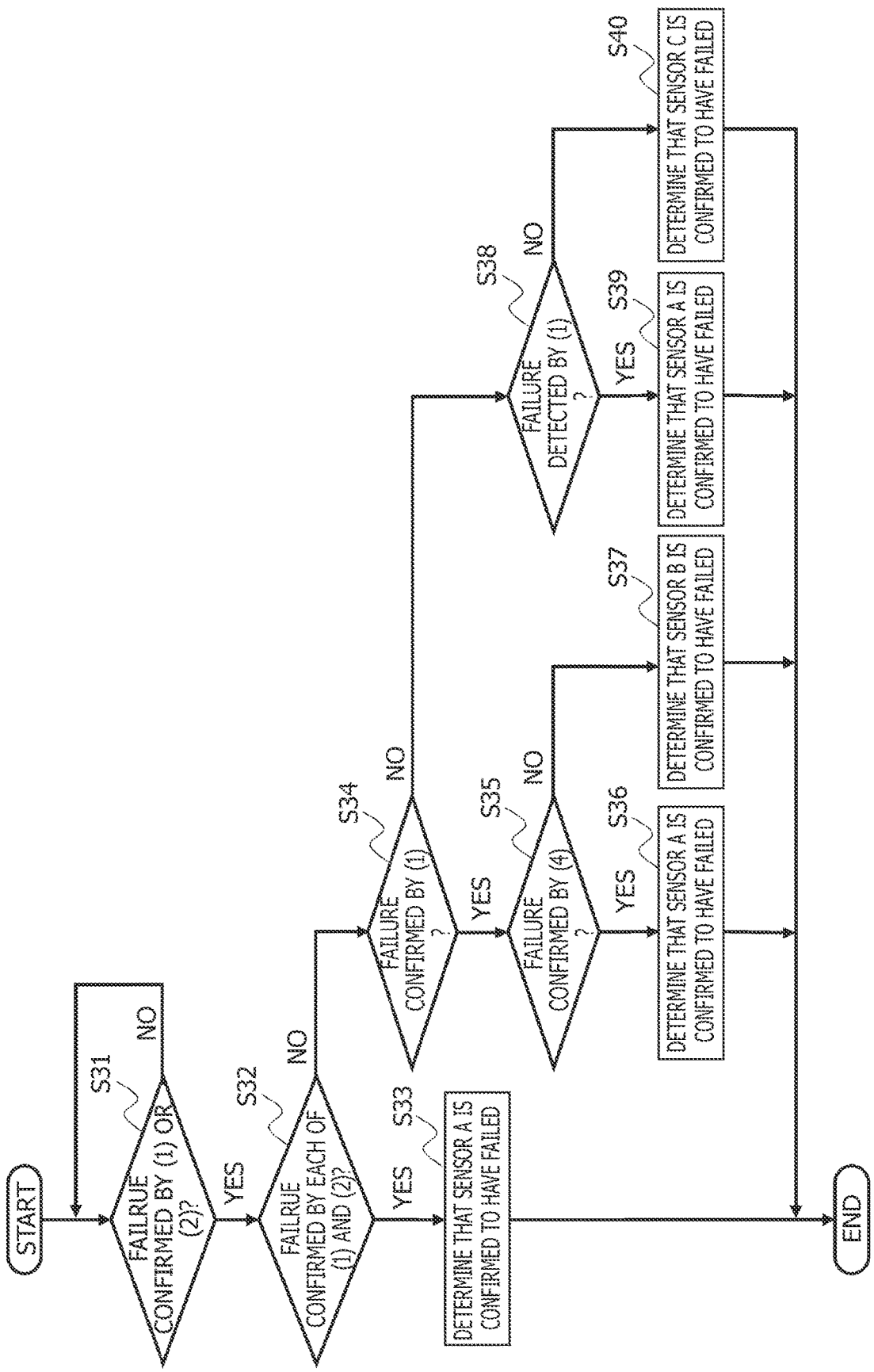

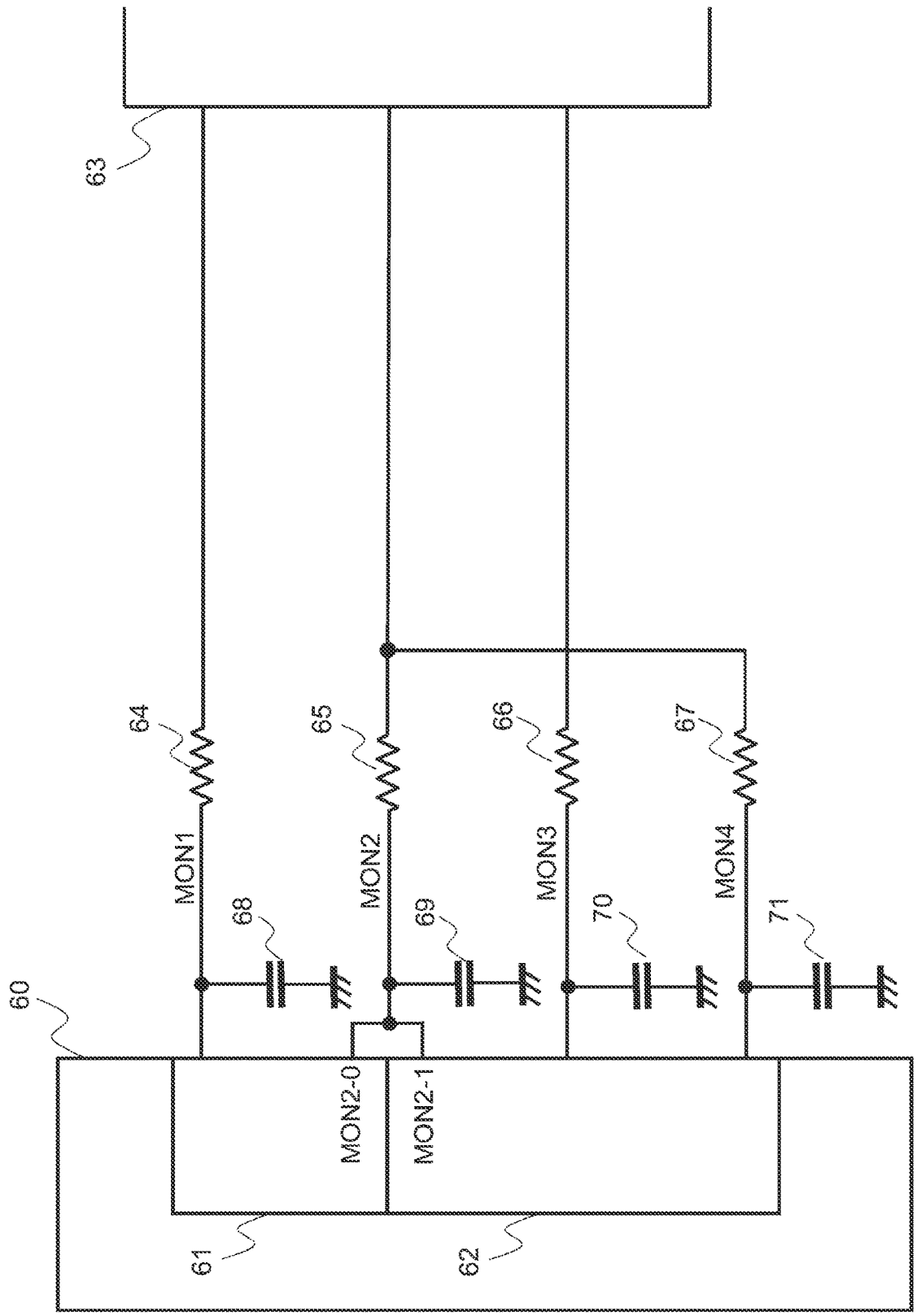

FIG.24A

| | DIFFERENCE 1 (CONSTANTLY MONITORED) | DIFFERENCE 2 | DIFFERENCE 3 (CONSTANTLY MONITORED) | DIFFERENCE 4 |
|---|---|---|---|---|
| MON1 | ○ | - | ○ | - |
| MON3 | ○ | - | - | ○ |
| MON2-0 | - | ○ | ○ | ○ |
| MON2-1 | - | ○ | - | - |

FIG. 24B

| ABNORMALITY CONFIRMATION | DIFFERENCE 1 (CONSTANTLY MONITORED) | DIFFERENCE 2 | DIFFERENCE 3 (CONSTANTLY MONITORED) | DIFFERENCE 4 | LOCATION OF ABNORMALITY |
|---|---|---|---|---|---|
| DIFFERENCE 1 | - | ABNORMALITY DETECTED | - | - | ADC |
|  | - | NO ABNORMALITY DETECTED | ABNORMALITY DETECTED | NO ABNORMALITY DETECTED | MON1 |
|  | - | NO ABNORMALITY DETECTED | NO ABNORMALITY DETECTED | ABNORMALITY DETECTED | MON3 |
|  | - | NO ABNORMALITY DETECTED | ABNORMALITY DETECTED | ABNORMALITY DETECTED | UNDETERMINABLE |
| DIFFERENCE 3 | NO ABNORMALITY DETECTED | NO ABNORMALITY DETECTED | - | - | ADC |
|  | ABNORMALITY DETECTED | NO ABNORMALITY DETECTED | - | - | MON2 |
|  |  |  |  |  | MON1 |

ELECTRONIC CONTROL DEVICE, ELECTRIC POWER STEERING DEVICE, AND CONTROL DEVICE FOR ELECTRIC POWER STEERING DEVICE

TECHNICAL FIELD

The present invention relates to an electronic control device with a redundant configuration having a plurality of sensors, an electric power steering device including this electronic control device, and a control device for an electric power steering device. In particular, the present invention relates to a technique for diagnosing a sensor failure.

BACKGROUND ART

In recent years, implementing a redundant design of electric and electronic circuits as a countermeasure against random failures of elements has become common. By having redundant sensors and CPUs and selecting and using normal elements among the plurality of elements installed, control can be continued even after a failure (e.g., see Patent Document 1). In the case of a dual-system redundant configuration, two sensors for each system, in total at least four sensors, are needed to compare output signals of sensors.

REFERENCE DOCUMENT LIST

Patent Document

Patent Document 1: WO 2018/173561

SUMMARY OF THE INVENTION

Problem to be Solved by the Invention

An electric power steering device having a dual-system redundant configuration is configured such that, when one of the sensors fails, not which sensor has failed, but in which system the failure has occurred, is determined, and the system on the failure side is stopped. Which sensor has failed is not identified because examining the sensors for a failure involves comparing them in pairs in a round-robin manner, which is inefficient and time-consuming.

In a fail-safe state, therefore, even when only one sensor has failed, the operation of the CPU on the failure side stops, and thus, the processing capacity of this CPU and the function of the remaining normal sensors are wasted.

An object of the present invention, which has been made in view of this situation, is to provide an electronic control device, an electric power steering device, and a control device of an electric power steering device that can examine sensors with less arithmetic processing load at times of normal operation and can easily identify the location of a failure in the event of a sensor failure.

Means for Solving the Problem

According to one aspect of the present invention, a control device of an electric power steering device is provided. The electric power steering device includes a first sensor, a second sensor, and a third sensor that detect a physical quantity relating to a steering state, and an electric motor that applies a steering force to a steering wheel. The control device has an arithmetic processing device, and the arithmetic processing device has: a first comparison unit that compares a difference between a first output signal output from the first sensor and a second output signal output from the second sensor with a first threshold value to determine a magnitude relationship, and compares a difference between the first output signal and a third output signal output from the third sensor with a second threshold value to determine a magnitude relationship; a first failure diagnosis unit that, based on a result of the first comparison unit, identifies one abnormal sensor among the first sensor, the second sensor, and the third sensor; and a first drive control unit that generates a drive control signal for driving the electric motor using output values from two normal sensors that are not identified as abnormal sensors among the first sensor, the second sensor, and the third sensor.

According to another aspect of the present invention, an electric power steering device is provided that includes: a steering mechanism; a first sensor, a second sensor, and a third sensor that are provided in the steering mechanism and detect a physical quantity relating to a steering state; an electric motor that applies a steering force to a steering wheel through the steering mechanism; and a control device that controls the electric motor. The control device has: a first comparison unit that compares a difference between a first output signal output from the first sensor that detects a physical quantity relating to a steering state and a second output signal output from the second sensor that detects a physical quantity relating to the steering state with a first threshold value to determine a magnitude relationship, and compares a difference between the first output signal and a third output signal output from the third sensor that detects a physical quantity relating to the steering state with a second threshold value to determine a magnitude relationship; a first failure diagnosis unit that, based on a result of the first comparison unit, identifies one abnormal sensor among the first sensor, the second sensor, and the third sensor; and a first drive control unit that generates a drive control signal for driving the electric motor using output values from two normal sensors that are not identified as abnormal sensors among the first sensor, the second sensor, and the third sensor.

Furthermore, according to a different aspect of the present invention, an electronic control device is provided that includes: a first comparison unit that compares a difference between a first output signal output from a first sensor and a second output signal output from a second sensor with a first threshold value to determine a magnitude relationship, and compares a difference between the first output signal and a third output signal output from a third sensor with a second threshold value to determine a magnitude relationship; a first failure diagnosis unit that, based on a result of the first comparison unit, identifies one abnormal sensor among the first sensor, the second sensor, and the third sensor; and a first drive control unit that generates a drive control signal for driving the electric motor using output values from two normal sensors that are not identified as abnormal sensors among the first sensor, the second sensor, and the third sensor.

Effects of the Invention

According to the present invention, diagnoses are made by comparing output signals of two pairs of sensors among three sensors, so that the sensors can be examined with less arithmetic processing load at times of normal operation. In the event of a sensor failure, the location of the failure can be easily identified by identifying the failed sensor based on a combination of three states, "detected," "not detected," and "abnormality confirmed."

Thus, an electronic control device, an electric power steering device, and a control device of an electric power steering device that can examine sensors with less arithmetic processing load at times of normal operation and can easily identify the location of a failure in the event of a sensor failure can be provided.

BRIEF DESCRIPTION OF THE DRAWINGS

FIG. 1 is a block diagram showing a schematic configuration of an electronic control device according to an embodiment of the present invention.

FIG. 2 is a flowchart showing a redundant diagnosis logic in the electronic control device of FIG. 1.

FIG. 3 is a flowchart showing a logic for switching sensors to be used for control and diagnosis in the electronic control device of FIG. 1.

FIG. 4 is a diagram for describing switching of sensors when a failure has not yet occurred.

FIG. 5 is a diagram for describing switching of sensors when a primary failure has occurred in sensor A. FIG. 6 is a diagram for describing switching of sensors when a primary failure has occurred in sensor B.

FIG. 7 is a diagram for describing switching of sensors when a primary failure has occurred in sensor C.

FIG. 8 is a diagram for describing switching of sensors when a primary failure has occurred in sensor D.

FIG. 9 is a diagram for describing a relationship between a sensor confirmed as failed and a control sensor before failure when a primary failure has occurred in sensor A and a secondary failure has occurred in sensor B and when a primary failure has occurred in sensor B and a secondary failure has occurred in sensor A.

FIG. 10 is a diagram for describing a relationship between the sensor confirmed as failed and the control sensor before failure when a primary failure has occurred in sensor A and a secondary failure has occurred in sensor C and when a primary failure has occurred in sensor C and a secondary failure has occurred in sensor A.

FIG. 11 is a diagram for describing a relationship between the sensor confirmed as failed and the control sensor before failure when a primary failure has occurred in sensor A and a secondary failure has occurred in sensor D and when a primary failure has occurred in sensor D and a secondary failure has occurred in sensor A.

FIG. 12 is a diagram for describing a relationship between the sensor confirmed as failed and the control sensor before failure when a primary failure has occurred in sensor B and a secondary failure has occurred in sensor C and when a primary failure has occurred in sensor C and a secondary failure has occurred in sensor B.

FIG. 13 is a diagram for describing a relationship between the sensor confirmed as failed and the control sensor before failure when a primary failure has occurred in sensor B and a secondary failure has occurred in sensor D and when a primary failure has occurred in sensor D and a secondary failure has occurred in sensor B.

FIG. 14 is a diagram for describing a relationship between the sensor confirmed as failed and the control sensor before failure when a primary failure has occurred in sensor C and a secondary failure has occurred in sensor D and when a primary failure has occurred in sensor D and a secondary failure has occurred in sensor C.

FIG. 15 is a flowchart showing a first modified example of the redundant diagnosis logic in the electronic control device according to the embodiment of the present invention.

FIG. 23 is a block diagram showing a third modified example of the electronic control device according to the embodiment of the present invention, as applied to current sensors.

FIG. 24A is a diagram for describing redundant diagnoses for determining a failure in the electronic control device of FIG. 23.

FIG. 24B is a diagram for describing the redundant diagnoses for determining a failure in the electronic control device of FIG. 23.

MODE FOR CARRYING OUT THE INVENTION

Figure 16:
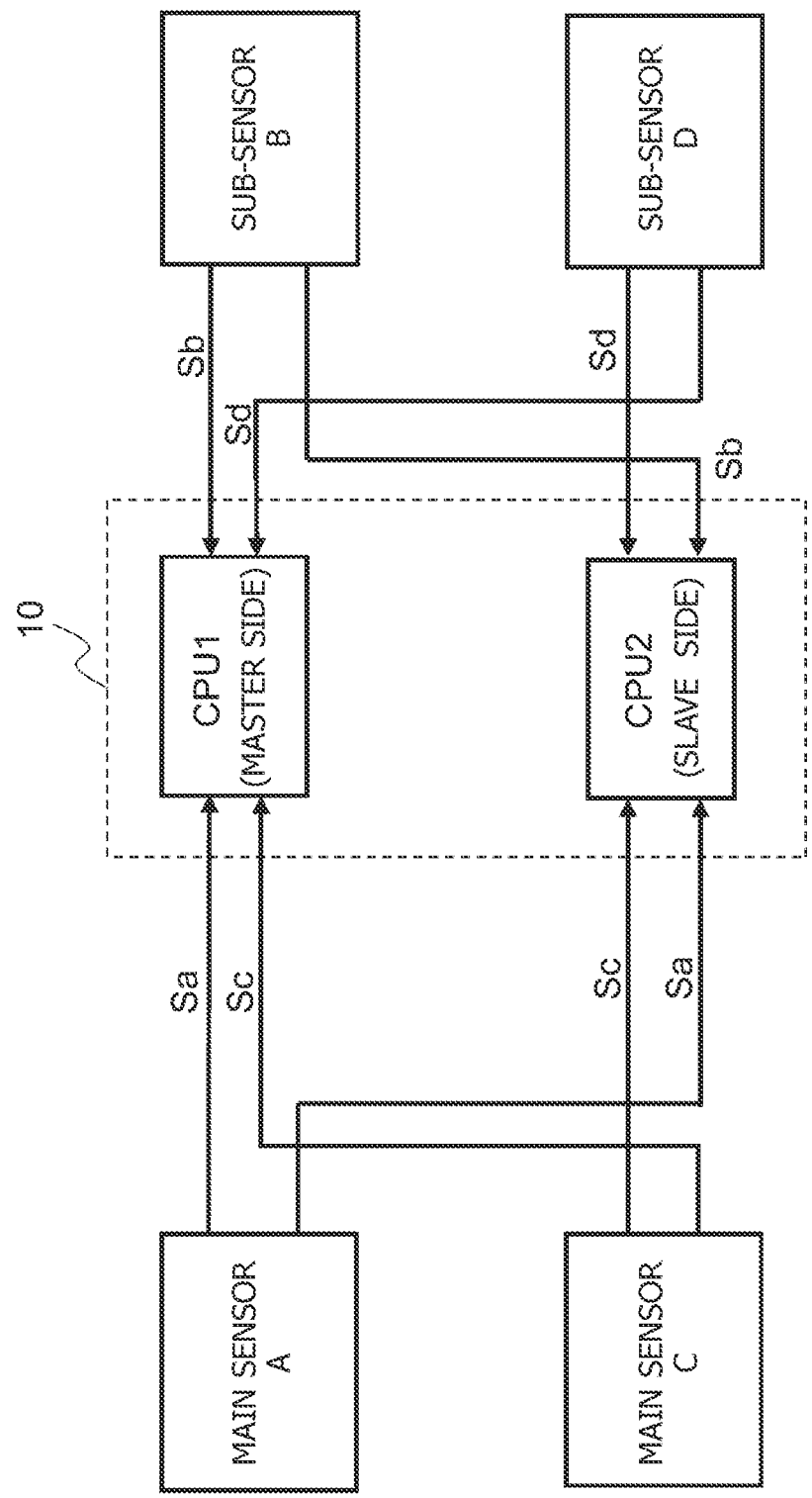
FIG. 16 is a block diagram showing a first modified example of the electronic control device according to the embodiment of the present invention.

Embodiments of the present invention will be described below with reference to the drawings.
Electronic Control Device FIG. 1 is a block diagram showing a schematic configuration of an electronic control device according to an embodiment of the present invention. This electronic control device includes an arithmetic processing device 10 including a CPU 1 (master side) and a CPU 2 (slave side), and mechanical sensors A to D of redundant dual systems. There are two systems in this configuration, and a first system is composed of CPU 1 and two sensors (a main sensor A and a sub-sensor B) that are directly wired to CPU 1. A second system is composed of CPU 2 and two sensors (a main sensor C and a sub-sensor D) that are directly wired to CPU 2. Inter-CPU communication is performed between CPU 1 and CPU 2, and sensor values can be exchanged between the systems.

Sensor values input into one CPU are four in total: two from its own system, one value input from the main sensor of the other system through a wire directly connected (in a cross form), and one value from the sub-sensor of the other system obtained through inter-CPU communication. Specifically, a first output signal Sa of main sensor A and a second output signal Sb of sub-sensor B, as well as a third output signal Sc of main sensor C of the second system and, by inter-CPU communication, a fourth output signal Sd of sub-sensor D of the second system are input into CPU 1 of the first system. Third output signal Sc of main sensor C and fourth output signal Sd of sub-sensor D, as well as first output signal Sa of main sensor A of the first system and, by inter-CPU communication, second output signal Sb of sub-sensor B of the first system are input into CPU 2 of the second system.

By comparing these four sensor values, each of two CPUs 1, 2 makes a failure diagnosis for four sensors A to D. A sensor used for control at normal times (control sensor) is sensor A for CPU 1 and sensor C for CPU 2 (sensor C corresponds to sensor A from the standpoint of CPU 2). The degrees of priority of sensors to be used as the control sensor from the standpoint of CPU 1 are: sensor A >sensor B >sensor C >sensor D.

Next, redundant diagnoses in the electronic control device configured as described above will be described based on the flowchart of FIG. 2.

As a premise, the redundant diagnoses compare a difference between detection values of two sensors with a threshold value α and make a determination according to whether the result is true or false. In the present invention, the following two diagnoses are executed at all times:

$$|A-B| > \alpha \quad (1)$$

$$|A-C| > \alpha \quad (2)$$

A state in which Formula (1) or Formula (2) is false as a result of these two
diagnoses will be referred to as "no failure detected." A state in which Formula (1) or Formula (2) is true will be referred to as "failure detected."

In addition, a state in which the failure detected state has continued for more than a set threshold time will be referred to as "failure confirmed."

In the following, a processing procedure of the redundant diagnosis logic will be described.

First, it is determined in which of the pairs, sensor A-sensor B and sensor A-sensor C, a failure is confirmed by the diagnoses of Formula (1) and Formula (2) (step S1). When a failure is not confirmed, the determination of step S1 is repeated.

Next, when it is determined that a failure in both pairs, sensor A-sensor B, and sensor A-sensor C, is confirmed by the diagnoses of Formula (1) and Formula (2) (step S2), an element commonly included in both diagnoses has a problem. Therefore, it is determined that sensor A has failed (step S3).

In addition, when a failure is confirmed by only one of the diagnoses of Formula (1) and Formula (2), by which one a failure is confirmed is determined. When a failure is confirmed by the diagnosis of Formula (1) (step S4) and a failure is detected by the diagnosis of Formula (2) (step S5), it is determined that the failed sensor is sensor A (step S6).

When a failure is confirmed by the diagnosis of Formula (1) (step S4) and a failure is not detected by the diagnosis of Formula (2), it is determined that the failed sensor is sensor B (step S7).

When a failure is confirmed by the diagnosis of Formula (2) and a failure is detected by the diagnosis of Formula (1) (step S8), it is determined that sensor A has failed (step S9). Conversely, when a failure is confirmed by Formula (2) and a failure is not detected by Formula (1), it is determined that the failed sensor is sensor C (step S10).

In contrast to a conventional technique of diagnosing three sensors (sensor A, sensor B, and sensor C) that involves comparing the output signals of the three sensors with one another, the above process can determine a failure of three sensors by determining a combination of the states "undetected," "detected," and "confirmed" for the two diagnoses. With the number of diagnoses thus reduced, an increase in the amount of processing accompanying an increase in the number of sensors can be avoided.

Next, a logic for switching the sensors used for control and diagnosis will be described. FIG. 3 is a flowchart showing the process of the sensor switching logic.

Here, the control sensor is sensor A and the diagnosis sensors are sensor B, sensor C, and sensor D, and the order of priority of sensors to be used is: sensor A >sensor B >sensor C >sensor D.

First, it is determined whether one sensor among sensors A, B, C, D has failed (step S11). When none of the sensors has failed, the determination of step S11 is repeated.

Next, it is determined whether sensor A (the sensor with the highest degree of priority that is being used for control) has failed (step S12).

When sensor A has failed, it is determined whether sensors B, C, D have also failed (step S13). When these sensors have not failed (only sensor A has failed), the control sensor is switched to sensor B, and the diagnoses are switched to a combination excluding the failed sensor, for example, a combination of |B-C|, |B-D| (step S14).

When one or more sensors other than sensor A have failed, the number of the failed sensors is determined (step S15). When one sensor (two in total) has failed, a sensor with a higher degree of priority among the normal sensors is switched to the control sensor. Furthermore, one diagnosis is made using the two normal sensors (step S16).

In addition, when two or more sensors (three or more in total) have failed, as the number of the normal sensors is one or less and a diagnosis is impossible, the system is stopped (step S17).

When sensor A has not failed in step S12 and one or more of sensor B, sensor C, and sensor D have failed, the number of the failed sensors is determined (step S18). When one sensor (one in total) has failed, the control sensor is not switched and two diagnoses are made using the three normal sensors (step S19).

In addition, when two sensors among sensor B, sensor C, and sensor D (two in total) have failed (step S20), the control sensor is not switched and one diagnosis is made using the two normal sensors (step S21). On the other hand, when three or more sensors (three or more in total) have failed, as the number of the normal sensors is one or less and a diagnosis is impossible, the system is stopped (step S22).

Each of FIG. 4 to FIG. 14 is a diagram for specifically describing switching of the sensors described above, and shows results of diagnoses and results of arithmetic operations by Formula (1) and Formula (2), as well as relationships among a sensor confirmed as failed, a control sensor before failure, and a control sensor after failure (after switching).

FIG. 4 shows a case in which a failure has not yet occurred. FIG. 5 shows a case in which a primary failure has occurred in sensor A. FIG. 6 shows a case in which a primary failure has occurred in sensor B. FIG. 7 shows a case in which a primary failure has occurred in sensor C. FIG. 8 shows a case in which a primary failure has occurred in sensor D.

As shown in FIG. 4, when a failure is not detected by each of the diagnoses based on Formula (1) and Formula (2) described above, the control sensor before failure remains sensor A and the control sensor after failure also remains sensor A.

When a failure is confirmed by the diagnosis based on Formula (1) and a failure is not detected by the diagnosis based on Formula (2), sensor B is confirmed as failed. The control sensor before failure remains sensor A and the control sensor after failure also remains sensor A.

Furthermore, when a failure is not detected by the diagnosis based on Formula (1) and a failure is confirmed by the diagnosis based on Formula (2), sensor C is confirmed as failed. The control sensor before failure remains sensor A and the control sensor after failure also remains sensor A.

In addition, when a failure is confirmed by the diagnosis based on Formula (1) and a failure is detected by the diagnosis based on Formula (2), sensor A is confirmed as failed. Since the control sensor before failure is sensor A, the control sensor after failure is switched to sensor B.

Similarly, when a failure is detected by the diagnosis based on Formula (1) and a failure is confirmed by the diagnosis based on Formula (2), and when a failure is confirmed by the diagnosis based on Formula (1) and a failure is confirmed by the diagnosis based on Formula (2), sensor A is confirmed as failed. Since the control sensor before failure is sensor A, the control sensor after failure is switched to sensor B.

While determinations when a failure has not yet occurred are made in FIG. 4, FIG. 5 to FIG. 8 show determinations of a secondary failure when a primary failure has occurred in sensors A to D, respectively.

Also, when a primary failure has occurred in sensor A as shown in FIG. 5, when a primary failure has occurred in sensor B as shown in FIG. 6, and when a primary failure has occurred in sensor C as shown in FIG. 7, a failed sensor is confirmed based on the diagnosis based on Formula (1) and the diagnosis based on Formula (2) and the control sensor after failure is changed from the control sensor before failure in the same manner as in FIG. 4.

The case in which a primary failure has occurred in sensor D as shown in FIG. 8 is the same as the case in which a failure has not yet occurred as shown in FIG. 4, and in this case, no switching occurs.

Each of FIG. 9 to FIG. 14 is about determinations of a tertiary failure.

FIG. 9 shows a relationship between the sensor confirmed as failed and the control sensor before failure when a primary failure has occurred in sensor A and a secondary failure has occurred in sensor B, and when a primary failure has occurred in sensor B and a secondary failure has occurred in sensor A. When a failure is not detected by the diagnosis (1) based on |C-D|, the sensor confirmed as failed is unknown and the control sensor before failure is sensor C. When a failure is confirmed by the diagnosis (1) based on |C-D|, it is confirmed that the failed sensor is sensor C. The control sensor before failure is also sensor C.

FIG. 10 shows a relationship between the sensor confirmed as failed and the control sensor before failure when a primary failure has occurred in sensor A and a secondary failure has occurred in sensor C, and when a primary failure has occurred in sensor C and a secondary failure has occurred in sensor A. FIG. 11 shows a relationship between the sensor confirmed as failed and the control sensor before failure when a primary failure has occurred in sensor A and a secondary failure has occurred in sensor D, and when a primary failure has occurred in sensor D and a secondary failure has occurred in sensor A.

Under these conditions, when a failure is not detected by the diagnosis (1) based on |B-D| or |B-C|, the sensor confirmed as failed is unknown and the control sensor before failure is sensor B. When a failure is confirmed by the diagnosis (1) based on |B-D| or |B-C|, it is confirmed that the failed sensor is sensor B. The control sensor before failure is also sensor B.

FIG. 12 shows a relationship between the sensor confirmed as failed and the control sensor before failure when a primary failure has occurred in sensor B and a secondary failure has occurred in sensor C, and when a primary failure has occurred in sensor C and a secondary failure has occurred in sensor B. FIG. 13 shows a relationship between the sensor confirmed as failed and the control sensor before failure when a primary failure has occurred in sensor B and a secondary failure has occurred in sensor D, and when a primary failure has occurred in sensor D and a secondary failure has occurred in sensor B. FIG. 14 shows a relationship between the sensor confirmed as failed and the control sensor before failure when a primary failure has occurred in sensor C and a secondary failure has occurred in sensor D, and when a primary failure has occurred in sensor D and a secondary failure has occurred in sensor C.

Under these conditions, when a failure is not detected by the diagnosis (1) based on |A-D|, |A-C|, or |A-B|, the sensor confirmed as failed is unknown and the control sensor before failure is sensor A. When a failure is confirmed by the diagnosis (1) based on |A-D|, |A-C|, or |A-B|, it is confirmed that the failed sensor is sensor A. The control sensor before failure is also sensor A.

As has been described above, all failure patterns can be covered by combining a primary failure determination pattern (FIG. 4), a secondary failure determination pattern (FIG. 5 to FIG. 8), and a tertiary failure determination pattern (FIG. 9 to FIG. 14).

Thus, in the event of a sensor failure, the location of the failure can be easily identified by identifying the failed sensor based on a combination of the three states, "detected," "not detected," and "abnormality confirmed." As a result, it is possible to exclude an abnormal sensor among sensors used for diagnosis and thereby improve diagnostic safety.

Next, corrections needed when performing arithmetic operations in the redundant diagnoses will be described. Here, the needed corrections include a correction for a difference in the timing of acquiring sensor values between the CPUs and a correction for a delay in sending and receiving data using inter-CPU communication.

In this configuration, importance is placed on the independence of the dual systems and these systems are not synchronized. Therefore, there is a lag in sensor acquisition timing between the CPUs. To match the timings, the extent of the lag is measured.

In this configuration, single edge nibble transmission (SENT) is used as a sensor communication method. A trigger pulse in SENT communication is communicated by an independent bus between CPU 1 and CPU 2.

Furthermore, sending and receiving of a pulse are executed by a fixed-cycle task, and the time between sending and receiving of a pulse constitutes the difference in timing between the CPUs. Therefore, the sensor value should be linearly corrected by the amount of time of this difference in timing.

In inter-CPU communication, a delay occurs depending on the timing of processing and the amount of communication. In this configuration, there is a delay of about 1 to 3 ms. Therefore, when using a received value for the redundant diagnoses, the CPU buffers a sensor value on its own side, and when comparing it with the received value, confirms whether there is a lag due to delay by comparison. When there is a delay, the CPU can correctly perform the redundant diagnoses by using the buffered past value as the sensor value on its own side.

The electronic control device configured as has been described above can produce the following effects (a) to (c):

(a) In contrast to the conventional technique of diagnosing three sensors that involves comparing the output signals of the three sensors with one another, this electronic control device diagnoses by comparing the output signals of two sensors and thus can examine the sensors with less arithmetic processing load at times of normal operation. With the number of diagnoses thus reduced, an increase in the amount of processing accompanying an increase in the number of sensors can be avoided.

(b) In the event of a sensor failure, the location of the failure can be easily identified by identifying the failed sensor based on a combination of the three states, "detected," "not detected," and "abnormality confirmed." As a result, it is possible to exclude an abnormal sensor among sensors used for diagnosis and thereby improve diagnostic safety. Moreover, by making the above-described diagnoses, a failure of other sensors than control sensor A can also be determined, and a failure can be detected when only a diagnosis sensor (sensor B, sensor C, or sensor D) has failed.

(c) When an abnormality of only one sensor is detected by the diagnoses of comparing the output signals of two sensors, it is possible that an abnormality may be incorrectly detected or not be detected due to closeness to the threshold value. In this case, setting the threshold value of each of the two diagnoses to a different value can improve the detection accuracy near the diagnosis threshold value.

First Modified Example of Redundant Diagnoses

Next, a modified example of the redundant diagnoses will be described using the flowchart of FIG. 15. This modified example is intended to improve the detection accuracy of the redundant diagnoses near the threshold value.

As a premise for this modified example, two diagnoses are made in the same manner as described above and two types of threshold values are set for the diagnoses. This is because when, after a failure is confirmed by one of the diagnoses, the other diagnosis is near the threshold value, a failed sensor may be incorrectly determined. Therefore, the threshold value for the other diagnosis is set to a less stringent value to thereby at least avoid a situation in which an abnormality fails to be detected.

The following are diagnoses that are actually made. Here, $\alpha > \beta$ holds.

$$|A-B| > \alpha \quad (1)$$

$$|A-C| > \alpha \quad (2)$$

$$|A-B| > \beta \quad (3)$$

$$|A-C| > \beta \quad (4)$$

A state in which Formula (1), Formula (2), Formula (3), or Formula (4) is false as a result of these diagnoses will be referred to as "no failure detected."

In addition, a state in which Formula (1), Formula (2), Formula (3), or Formula (4) is true will be referred to as "failure detected." A state in which the failure detected state continues for more than a set threshold time will be referred to as "failure confirmed."

First, it is determined in which of the pairs, sensor A-sensor B and sensor A-sensor C, a failure is confirmed by the diagnoses of Formula (1) and Formula (2) (step S31). When a failure is not confirmed, the determination of step S31 is repeated.

Next, when a failure is confirmed by each of Formula (1) and Formula (2) (step S32), an element commonly included in both diagnoses has a problem. Therefore, it is determined that sensor A has failed (step S33).

When a failure is confirmed by only one of the diagnoses of Formula (1) and Formula (2), it is determined by which one a failure is confirmed (step S34). When a failure is confirmed by Formula (1), the diagnosis result of Formula (4) is checked (step S35). When a failure is detected by Formula (4), it is determined that the failed sensor is sensor A (step S36). On the other hand, when a failure is not detected by Formula (4), it is determined that the failed sensor is sensor B (step S37).

When a failure is confirmed by Formula (2) in step S34, the diagnosis result of Formula (3) is checked (step S38). When a failure is detected by Formula (3), it is determined that the failed sensor is A (step S39). In addition, when a failure is not detected by Formula (3), it is determined that the failed sensor is C (step S39).

Making these determinations can improve the detection accuracy of the redundant diagnoses near the threshold value.

First Modified Example of Electronic Control Device

FIG. 16 shows a first modified example of the electronic control device according to the embodiment of the present invention. This electronic control device differs from the device shown in FIG. 1 in that, in FIG. 1, communication is performed between CPUs 1, 2 and sensor values of sub-sensor B and sub-sensor C are sent and received between CPUs 1, 2, whereas in this modified example, sub-sensor B is directly wired to CPUs 1, 2 and sub-sensor D is directly wired to CPUs 1, 2.

As the configuration is otherwise the same as in FIG. 1, the same parts will be denoted by the same reference signs and a detailed description thereof will be omitted.

Also in this configuration, the electronic control device can basically perform the same operation as in the configuration shown in FIG. 1 and produce substantially the same workings and effects.

Electric Power Steering Device

Figure 17:
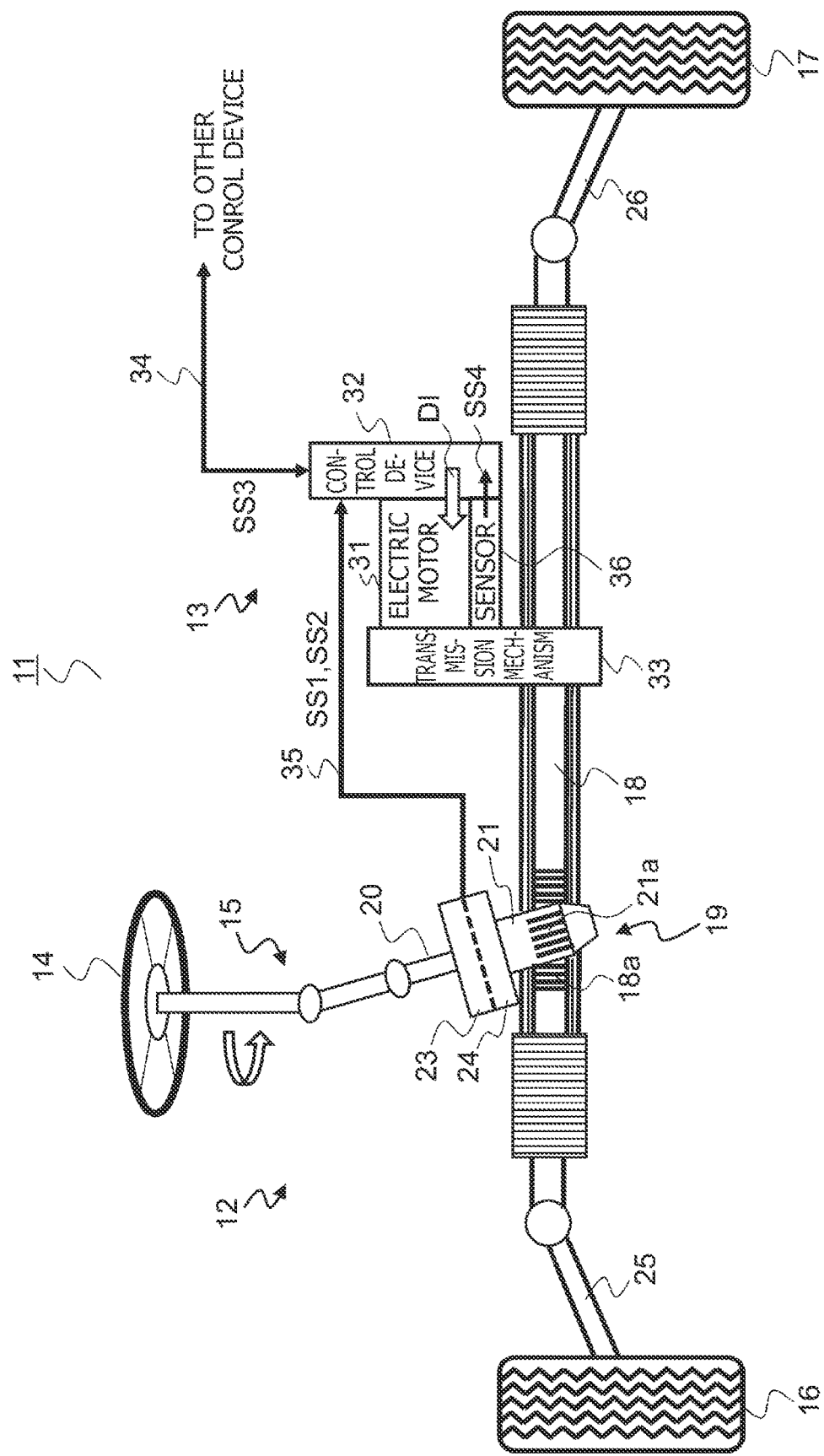
FIG. 17 is a system configuration diagram of an electric power steering device according to the embodiment of the present invention.

FIG. 17 shows an example of the system configuration of an electric power steering device according to the embodiment of the present invention. This electric power steering device 11 includes a steering mechanism 12 for performing steering based on operation by a driver, and a steering assistance mechanism 13 that assists the driver in steering operation.

Steering mechanism 12 has a steering shaft 15 linked to a steering wheel 14 and a rack bar (turning shaft) 18 linked to tires (turning wheels) 16, 17, and steering shaft 15 and rack bar 18 are linked together though a rack-and-pinion mechanism 19.

Steering shaft 15 is composed of an input shaft 20 as a first shaft member that rotates integrally with steering wheel 14 and an output shaft 21 as a second shaft member that is linked to rack bar 18, with both shafts coupled together by a torsion bar (not shown). Input shaft 20 is at one end side in an axial direction connected to steering wheel 14 and at the other end side connected to the torsion bar. Output shaft 21 is at one end side in an axial direction connected to the torsion bar and at the other end side linked to rack bar 18.

Pinion teeth 21a formed on an outer circumferential side at the other end of output shaft 21 mesh with rack teeth 18a formed on one end side in an axial direction (longitudinal direction) of rack bar 18, so that rotary motion of output shaft 21 is transmitted by being converted into axial motion of rack bar 18.

On a radially outer side (outer circumferential side) of steering shaft 15, a steering angle sensor 23 that detects a steering angle that is a rotation angle of steering shaft 15 and a torque sensor 24 that detects a steering torque applied to steering shaft 15 by steering operation of the driver are integrally provided as one unit. Steering angle sensor 23 detects the steering angle based on a difference in rotation angle between a pair of gears that rotate as steering shaft 15 rotates. Torque sensor 24 detects a steering torque based on amounts of rotational shift of input shaft 20 and output shaft 21 relative to each other.

On both ends of rack bar 18 in the axial direction, tires 16, 17 are mounted through tie rods 25, 26 and knuckle arms (not shown). As rack bar 18 moves in the axial direction and the knuckle arms are pushed and pulled through tie rods 25, 26, directions of tires 16, 17 are changed.

Steering assistance mechanism 13 has an electric motor (electric actuator) 31 that generates a steering assistance force, a control device (electronic control unit (ECU)) 32 that controls driving of electric motor 31 by supplying it with a control current (indicated by arrow DI), and a transmission mechanism 33 that transmits rotation of electric motor 31 to rack bar 18, and assists axial motion of rack bar 18 by a rotary force of electric motor 31.

Control device 32 is connected to other ECU, for example, a control device for electronic stability control (ESC) through a controller area network (CAN) bus 34, and exchanges information by CAN communication.

Driving of electric motor 31 is controlled based on detection results of various sensors, for example, an output signal SS1 of steering angle sensor 23 and an output signal SS2 of torque sensor 24 that are input into control device 32 through a sensor harness 35, an output signal SS3 of a vehicle speed sensor (not shown) that is input through CAN bus 34, and an output signal SS4 of a motor rotation angle sensor 36 that detects a rotation angle of electric motor 31.

While this is not shown, motor rotation angle sensor 36 includes four sensors in this example. Motor rotation angle sensor 36 has a magnet having N poles and S poles arrayed in a circumferential direction of a rotational axis of a shaft, and a substrate. The substrate is provided at an interval from the magnet in the direction of the rotational axis of the shaft, and has a first surface on a magnet side in the direction of the rotational axis of the shaft and a second surface on the opposite side from the magnet. A first sensor and a third sensor are mounted on the first surface of the substrate, and a second sensor and a fourth sensor are mounted on the second surface of the substrate.

Transmission mechanism 33 has a speed reducer that reduces the speed of rotation of electric motor 31, and a conversion mechanism that converts rotation of the speed reducer into axial motion of rack bar 18. The speed reducer is composed of, for example, an input pulley that is fixed on a driveshaft of electric motor 31 so as to rotate integrally, an output pulley that is fixed so as to be able to rotate integrally with a nut acting as a conversion mechanism, and a belt and a chain that are transmission members wound around these pulleys.

As the conversion mechanism, for example, a ball screw mechanism using a nut that is formed in a cylindrical shape so as to surround rack bar 18 can be used. On an inner circumference of the nut, a nut-side ball screw groove is formed in a spiral shape, and on an outer circumference of rack bar 18, a steering shaft-side ball screw groove is formed in a spiral shape. With the nut fitted on rack bar 18, a ball circulation groove is formed by the nut-side ball screw groove and the steering shaft-side ball screw groove.

An inside of the ball circulation groove is filled with a plurality of metal balls, and when the nut rotates, the balls move inside the ball circulation groove, causing rack bar 18 to move in the axial direction relatively to the nut. As the ball screw mechanism converts rotary motion of electric motor 31 into linear motion and causes rack bar 18 to move in the axial direction, the knuckle arms are pushed and pulled through tie rods 25, 26 and a steering force is applied to tires 16, 17.

As the speed reducer, a worm gear can be used that has a worm shaft that is coupled to an output shaft of electric motor 31 so as to be able to rotate integrally and a worm wheel that rotates by meshing with this worm shaft. As the conversion mechanism, a so-called rack-and-pinion mechanism can also be used that is composed of pinion teeth that are formed on the outer circumferential side, at the other end in the axial direction, of the output shaft that rotates integrally with a worm wheel, and rack teeth that are formed on the other end side in the axial direction of rack bar 18 and mesh with the pinion teeth.

Figure 18:
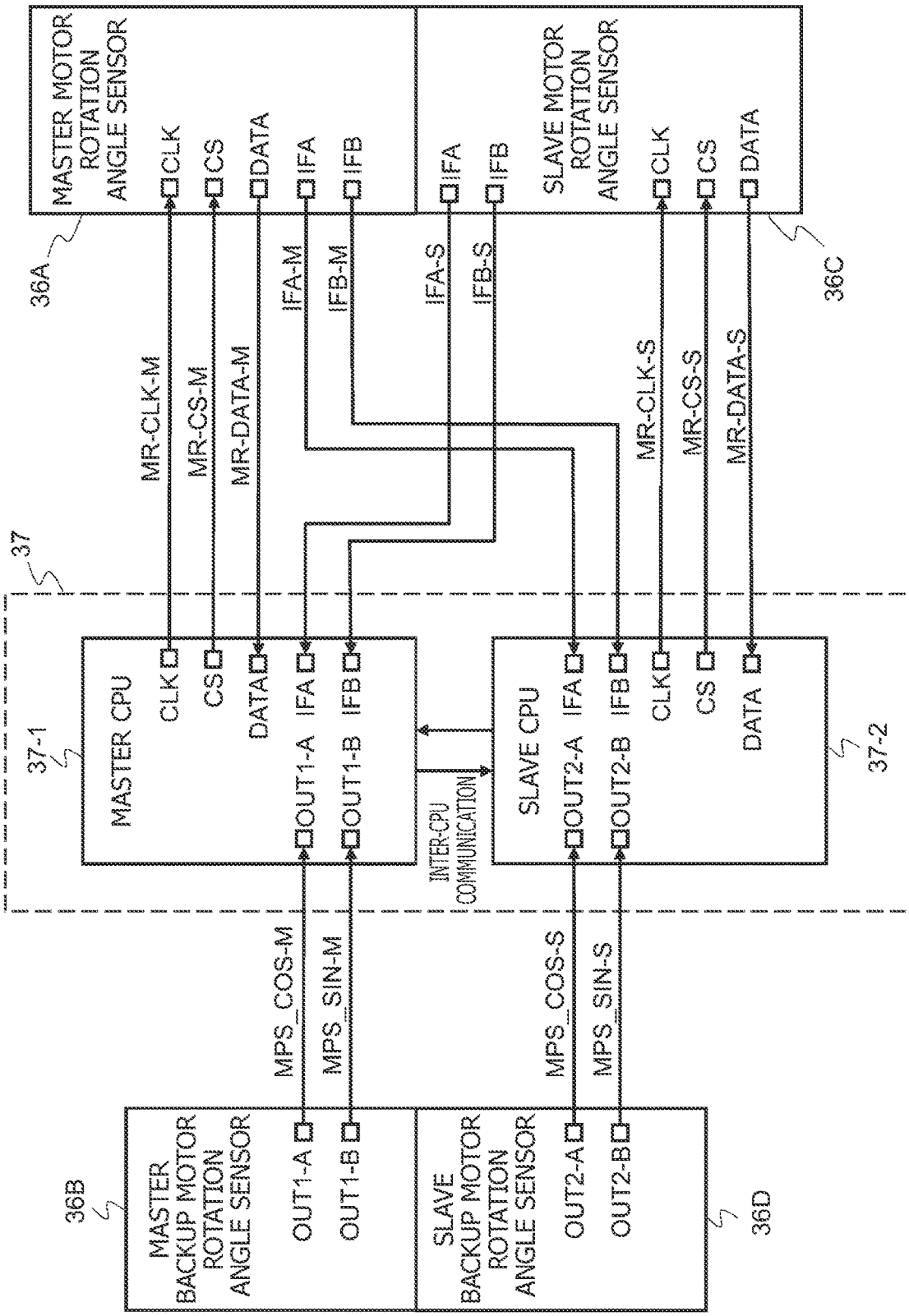
FIG. 18 is a block diagram showing a schematic configuration of a motor rotation angle sensor and an arithmetic processing device extracted from the electric power steering device of FIG. 17.

FIG. 18 shows schematic configurations of motor rotation angle sensor 36 and an arithmetic processing device 37 extracted from electric power steering device 11 of FIG. 17. Arithmetic processing device 37 represents some of functions of control device 32 of FIG. 17, and includes a master CPU 37-1 and a slave CPU 37-2. Master CPU 37-1 and slave CPU 37-2 exchange data from sensors by inter-CPU communication (inter-microcomputer communication). Motor rotation angle sensor 36 includes a master motor rotation angle sensor 36A as a first sensor, a master backup motor rotation angle sensor 36B as a second sensor, a slave motor rotation angle sensor 36C as a third sensor, and a slave backup motor rotation angle sensor 36D as a fourth sensor.

A clock signal MR-CLK-M and a chip select signal MR-CS-M are input from a clock terminal CLK and a chip select terminal CS of master CPU 37-1 into clock terminal CLK and a chip select terminal CS of master motor rotation angle sensor 36A. A clock signal MR-CLK-S and a chip select signal MR-CS-S are supplied from a clock terminal CLK and a chip select terminal CS of slave CPU 37-2 into a clock terminal CLK and a chip select terminal CS of slave motor rotation angle sensor 36C.

A signal MR-DATA-M corresponding to a rotation angle of electric motor 31 is input from a data terminal DATA of master motor rotation angle sensor 36A into a data terminal DATA of master CPU 37-1. Signals IFA-M, IFB-M are input from terminals IFA, IFB of master motor rotation angle sensor 36A into terminals IFA, IFB of slave CPU 37-2.

In addition, a signal MR-DATA-S corresponding to a rotation angle of electric motor 31 is input from a data terminal DATA of slave motor rotation angle sensor 36C into a data terminal DATA of slave CPU 37-2. Signals IFA-S, IFB-S are input from terminals IFA, IFB of slave motor rotation angle sensor 36C into terminals IFA, IFB of master CPU 37-1.

Furthermore, detection signals MPS_COS-M, MPS_SIN-M are input from output terminals OUT1-A, OUT1-B of master backup motor rotation angle sensor 36B into terminals OUT1-A, OUT1-B, respectively, of master CPU 37-1. Detection signals MPS_COS-S, MPS_SIN-S are input from output terminals OUT2-A, OUT2-B of slave backup motor rotation angle sensor 36D into terminals OUT2-A, OUT2-B, respectively, of slave CPU 37-2.

Here, diagnosis targets are master motor rotation angle sensor 36A and slave motor rotation angle sensor 36C. As diagnosis signals, signal MR-DATA-M, signals IFA-M, IFB-M, signal MR-DATA-S, signals IFA-S, IFB-S, detection signals MPS_COS-M, MPS_SIN-M, and detection signals MPS_COS-S, MPS_SIN-S are used. Some of these signals are sent and received between master CPU 37-1 and slave CPU 37-2 by inter-CPU communication.

Figure 19:
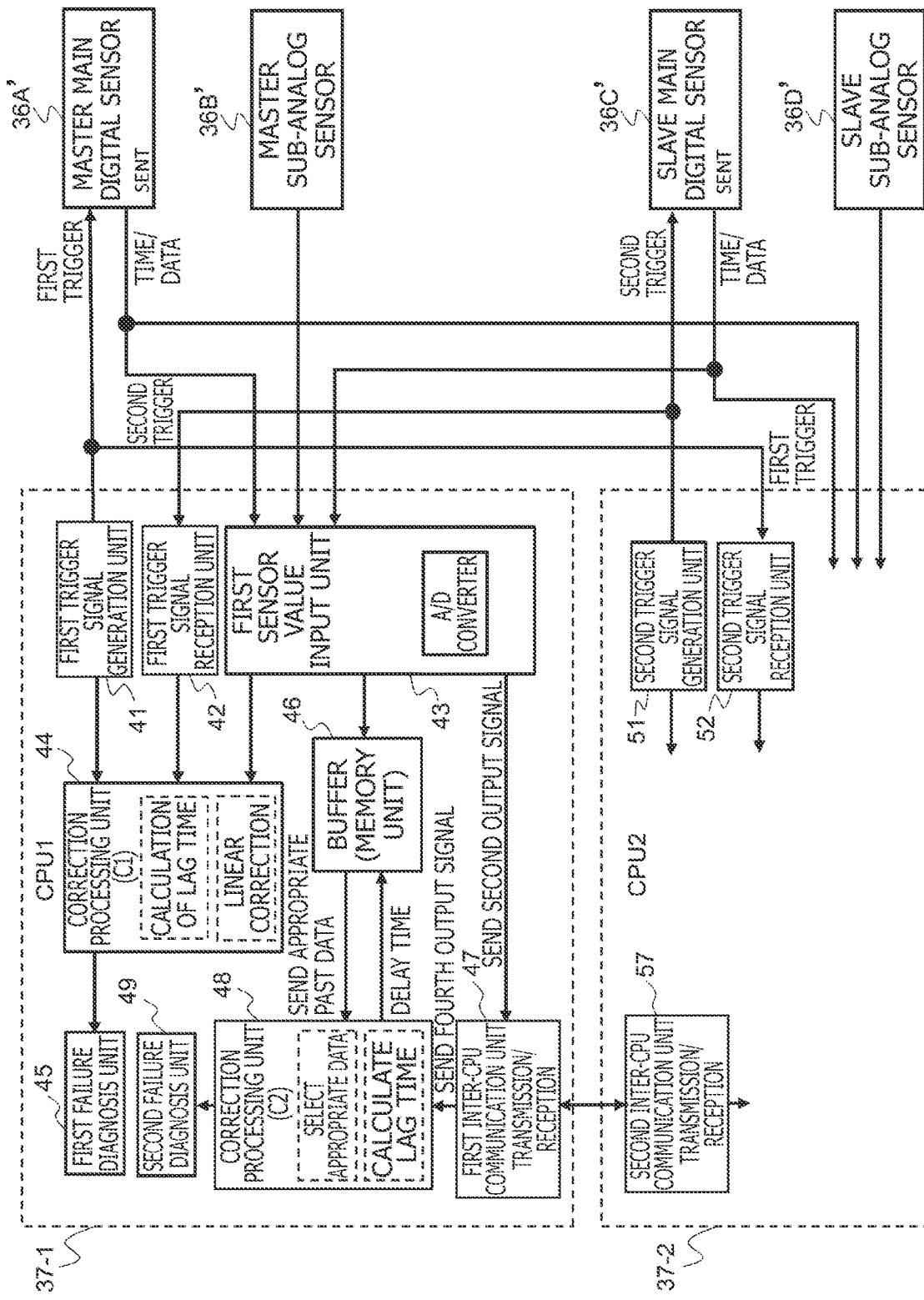
FIG. 19 is a block diagram showing a specific example of the configurations of the motor rotation angle sensor and the arithmetic processing device in FIG. 18.

FIG. 19 shows a specific example of the configurations of the motor rotation angle sensor and the arithmetic processing device in FIG. 18. In this example, digital sensors are used as master motor rotation angle sensor 36A and slave motor rotation angle sensor 36C, and analog sensors are used as master backup motor rotation angle sensor 36B and slave backup motor rotation angle sensor 36D. Thus, a master sub-analog sensor 363 and a slave sub-analog sensor 36D' are analog sensors having a narrower magnetism detection range than a master main digital sensor 36A' and a slave main digital sensor 36C'.

In FIG. 19, master main digital sensor 36A' corresponds to master motor rotation angle sensor 36A in FIG. 18, and slave main digital sensor 36C' corresponds to slave motor rotation angle sensor 36C. Master sub-analog sensor 36B' corresponds to master backup motor rotation angle sensor 36B, and slave sub-analog sensor 36D' corresponds to slave backup motor rotation angle sensor 36D.

CPU 37-1 includes, in its configuration, a first trigger signal generation unit 41, a first trigger signal reception unit 42, a first sensor value input unit 43, a correction processing unit 44, a first failure diagnosis unit 45, a buffer (memory unit) 46, a first inter-CPU communication unit 47, a correction processing unit 48, a second failure diagnosis unit 49, etc.

While this is not shown, CPU 37-2 has a configuration similar to that of CPU 37-1.

A first trigger signal output from first trigger signal generation unit 41 is input into each of master main digital sensor 36A', a second trigger signal reception unit 52 of CPU 37-2, and correction processing unit 44. Similarly, a second trigger signal output from a second trigger signal generation unit 51 is input into each of slave main digital sensor 36C', first trigger signal reception unit 42 of CPU 37-1, and a correction processing unit of CPU 37-2.

Data on a time and a sensor value output from master main digital sensor 36A' is input into first sensor value input unit 43 of CPU 37-1 and a second sensor value input unit of CPU 37-2. Data (analog signal) output from master sub-analog sensor 36B' is input into an A/D converter provided inside first sensor value input unit 43 of CPU 37-1 and converted into a digital signal.

In addition, data on a time and a sensor value output from slave main digital sensor 36C' is input into the second sensor value input unit of CPU 37-2 and first sensor value input unit 43 of CPU 37-1. Data (analog signal) output from slave sub-analog sensor 36D' is input into an A/D converter provided inside the second sensor value input unit of CPU 37-2 and converted into a digital signal.

Each of output signals of first trigger signal generation unit 41, first trigger signal reception unit 42, and first sensor value input unit 43 is input into correction processing unit 44, where linear correction and calculation of a lag time are performed. Based on the result of the correction process by correction processing unit 44, first failure diagnosis unit 45 executes a failure diagnosis.

Each of sensor values of master main digital sensor 36A', master sub-analog sensor 363, and slave main digital sensor 36C' input into first sensor value input unit 43 is input into buffer 46 and stored. Furthermore, a second output signal of master sub-analog sensor 363 sent from first sensor value input unit 43 is input into first inter-CPU communication unit 47 and input into CPU 37-2 through second inter-CPU communication unit 57.

In addition, data (analog signal) output from slave sub-analog sensor 36D' is input into an A/D converter provided inside the second sensor value input unit of CPU 37-2 and converted into a digital signal. Then, this digital signal is input into second inter-CPU communication unit 57, sent as a fourth output signal through first inter-CPU communication unit 47, and input into correction processing unit 48 inside CPU 37-1.

Correction processing unit 48 performs a process of calculating a lag time and sending a delay time to buffer 46, receiving corresponding appropriate past data sent from buffer 46, and selecting this past data. Based on the result of the correction process by correction processing unit 48, second failure diagnosis unit 49 performs a failure diagnosis.

A failure diagnosis is performed also in CPU 37-2 in the same manner as in CPU 37-1.

Figure 20:
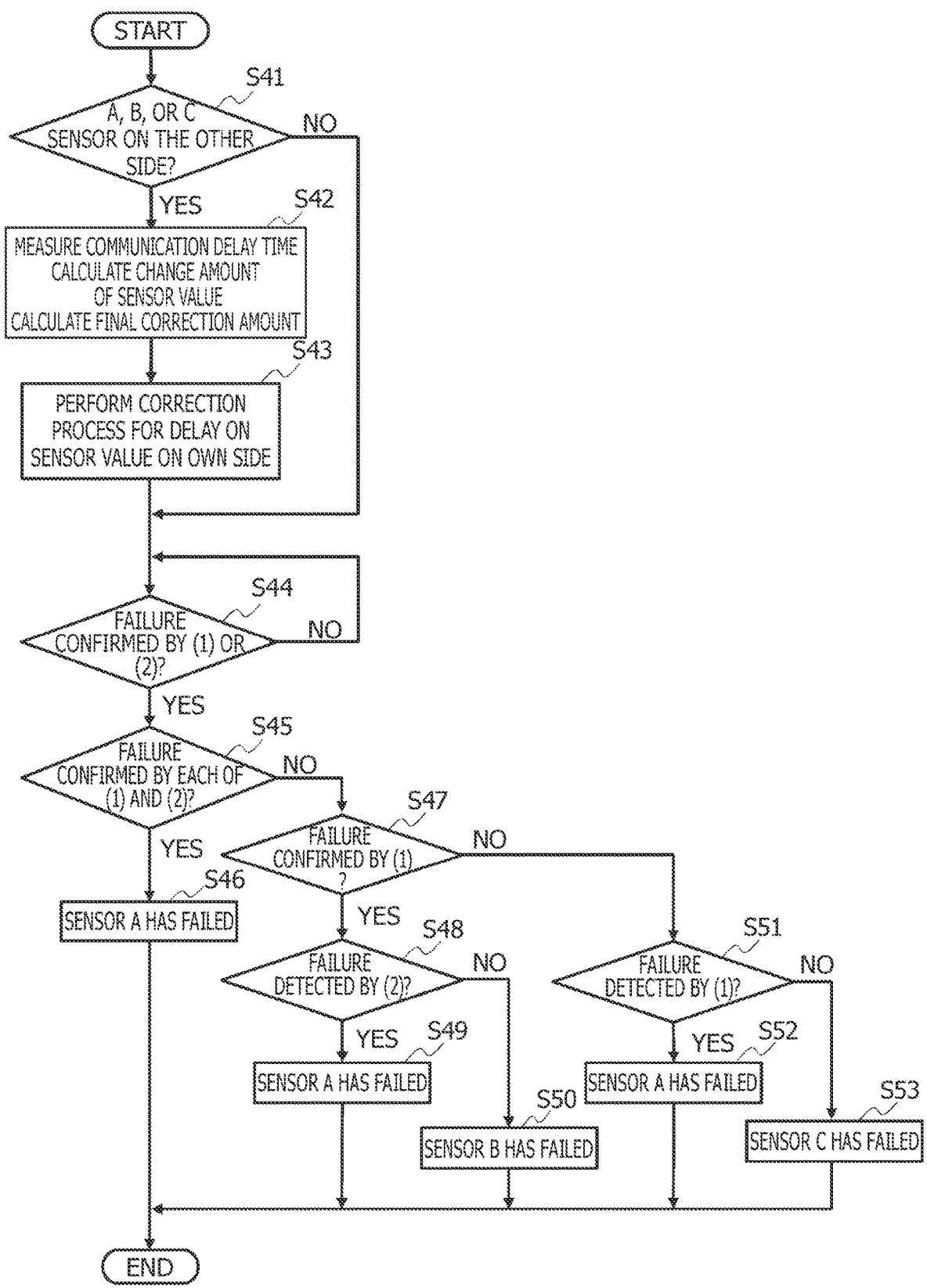
FIG. 20 is a flowchart of a redundant diagnosis logic of the arithmetic processing device shown in FIG. 19.

FIG. 20 is a flowchart of a redundant diagnosis logic of the electronic control device shown in FIG. 19. As a premise for the redundant diagnoses, the following Formulae (1) to (4) are met:

$$|A-B| \leq \alpha \quad (1)$$

$$|A-C| > \alpha \quad (2)$$

$$|A-B| > \beta \quad (3)$$

$$|A-C| > \beta \quad (4)$$

Here, $\alpha > \beta$ holds.

A state in which Formula (1), Formula (2), Formula (3), or Formula (4) is false as a result of these diagnoses will be referred to as "no failure detected." A state in which Formula (1), Formula (2), Formula (3), or Formula (4) is true will be referred to as "failure detected."

In addition, a state in which the failure detected state continues for more than a set threshold time will be referred to as "failure confirmed."

First, it is determined whether master main digital sensor 36A' (abbreviated as sensor A), master sub-analog sensor 36B' (abbreviated as sensor B), and slave main digital sensor 36C' (abbreviated as sensor C) are sensors on the other side, i.e., sensors on the slave side for master CPU 37-1 and sensors on the master side for slave CPU 37-2 (step S41). When these sensors are on the other side, a communication delay time is measured and a change amount of a sensor value is calculated, and a final correction amount is calculated (step S42).

In addition, when it is determined in step S41 that the sensors are not on the other side, a correction process for a delay is executed on a sensor value on the CPU's own side (step S43).

Next, it is determined in which of the pairs, sensor A-sensor B and sensor A-sensor C, a failure is confirmed by the diagnosis of Formula (1) or Formula (2) (step S44). When a failure is not confirmed, the determination of step S44 is repeated.

Subsequently, when it is determined that a failure in both pairs, sensor A-sensor B, and sensor A-sensor C, is confirmed by the diagnoses of Formula (1) and Formula (2) (step S45), an element commonly included in both diagnoses has a problem. Therefore, it is determined that sensor A has failed (step S46).

When a failure is confirmed by only one of the diagnoses of Formula (1) and Formula (2), it is determined by which one a failure is confirmed. When a failure is confirmed by the diagnosis of Formula (1) (step S47) and a failure is detected by the diagnosis of Formula (2) (step S48), it is determined that the failed sensor is sensor A (step S49).

In addition, when a failure is confirmed by the diagnosis of Formula (1) and a failure is not detected by the diagnosis of Formula (2), it is determined that the failed sensor is sensor B (step S50).

When a failure is confirmed by the diagnosis of Formula (2) and a failure is detected by the diagnosis of Formula (1) (step S51), it is determined that sensor A has failed (step S52). On the other hand, when a failure is confirmed by Formula (2) and a failure is not detected by Formula (1), it is determined that the failed sensor is sensor C (step S53).

As has been described above, when one of a plurality of motor rotation angle sensors has failed, it is possible to determine and output a correct motor rotation angle by identifying normal sensors by CPUs 37-1, 37-2.

Second Modified Example of Redundant Diagnoses

Figure 21A:
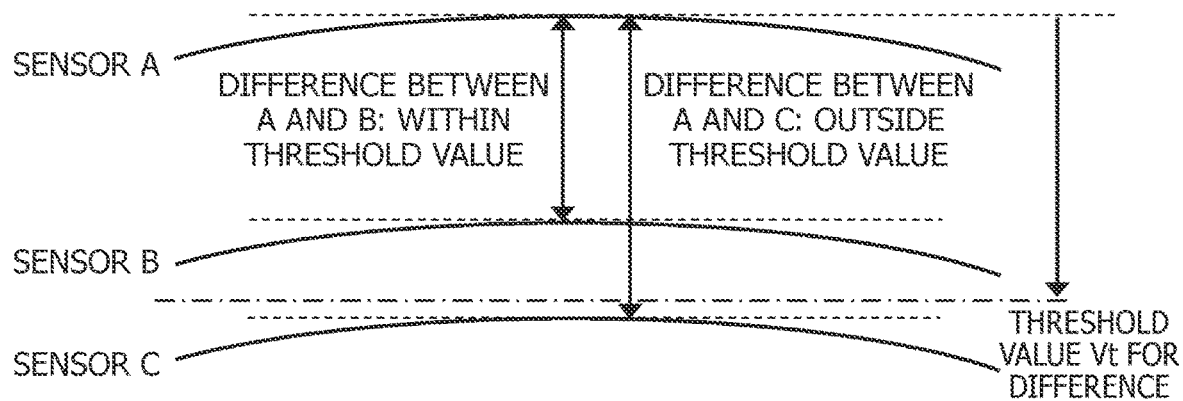
FIG. 21A is a schematic view for describing a second modified example of the redundant diagnosis logic in the electronic control device according to the embodiment of the present invention.
Figure 21B:
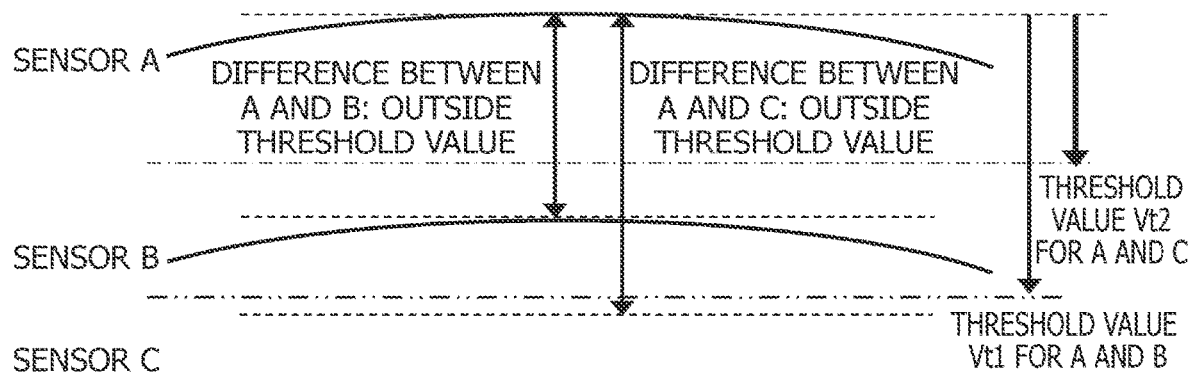
FIG. 21B is a schematic view for describing the second modified example of the redundant diagnosis logic in the electronic control device according to the embodiment of the present invention.

Each of FIG. 21A and FIG. 21B is a schematic view for describing a second modified example of the redundant diagnosis logic in the electronic control device according to the embodiment of the present invention. Here, a diagnosis process that can correctly detect a failure even when the value of a difference resulting from comparison is very close to a threshold value Vt will be described.

In the case in which sensor A has failed, if the difference between sensor A and sensor B is within the threshold value in the first diagnosis and the difference between sensor A and sensor C is outside the threshold value in the second diagnosis as shown in FIG. 21A, a failure of sensor C may be incorrectly detected.

To deal with this problem, as shown in FIG. 21B, two types of threshold values Vt1, Vt2 are prepared. When a failure is detected by only one of the diagnoses, making the other diagnosis with the diagnosis threshold value set to a more stringent value can eliminate overlooking of a failure of sensor A. In FIG. 21B, threshold value Vt2 as the threshold value for sensor A and sensor C is set to be more stringent than threshold value Vt1 for sensor A and sensor B. Thus, Vt1 >Vt2 holds.

By making diagnoses in this manner, a failure can be correctly detected even when the value of a difference resulting from comparison is very close to threshold value Vt.

Second Modified Example of Electronic Control Device

Figure 22:
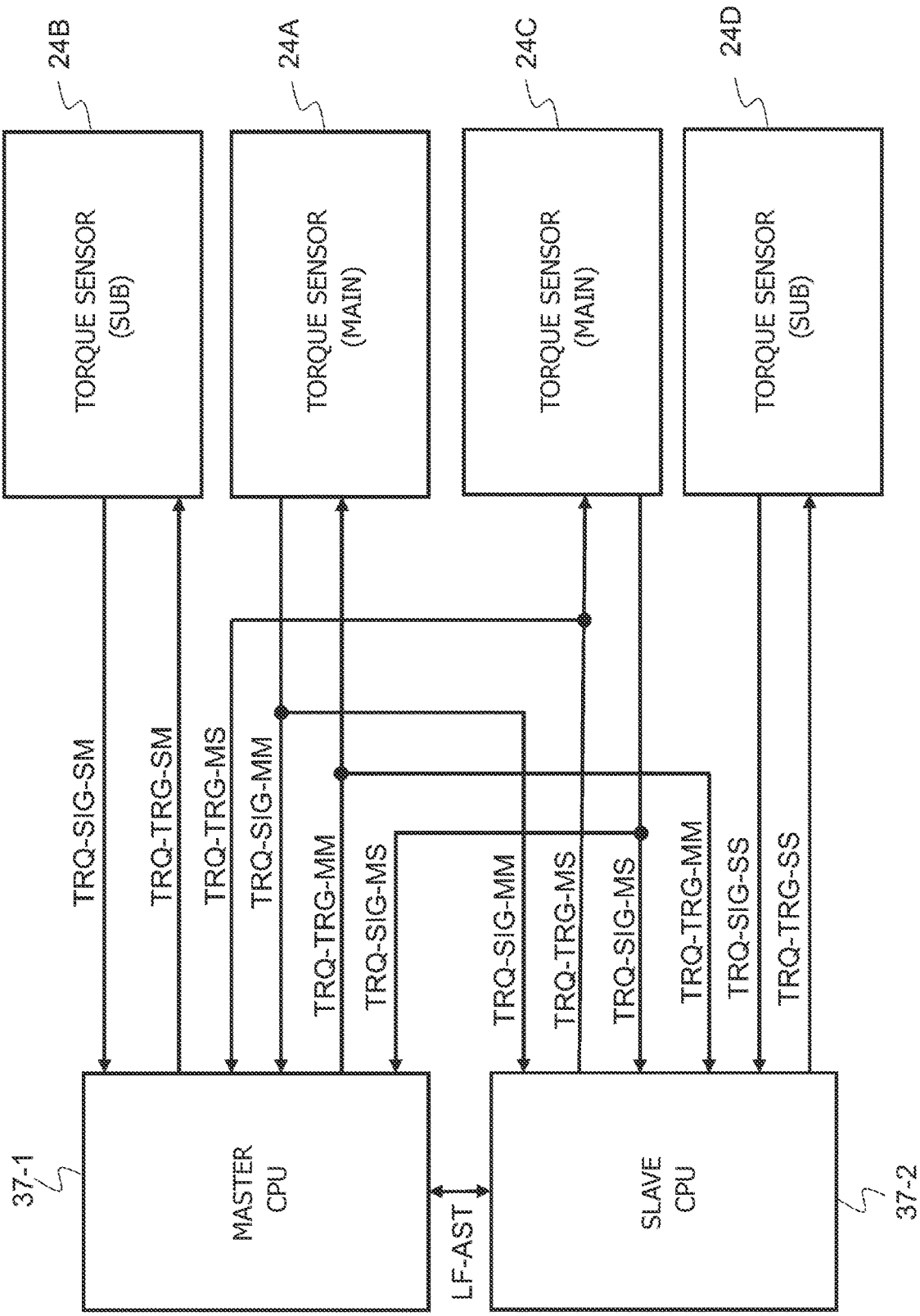
FIG. 22 is a block diagram showing a second modified example of the electronic control device according to the embodiment of the present invention, as applied to torque sensors.

FIG. 22 is a block diagram showing a second modified example of the electronic control device according to the embodiment of the present invention, as applied to torque sensor 24 in the electric power steering device shown in FIG. 17. Arithmetic processing device 37 represents some of the functions of control device 32 of FIG. 17, and includes master CPU 37-1 and slave CPU 37-2. Master CPU 37-1 and slave CPU 37-2 exchange data from the torque sensors by LF-AST communication. Torque sensor 24 includes a torque sensor (main) 24A, a torque sensor (sub) 24B, a torque sensor (main) 24C, and a torque sensor (sub) 24D.

Diagnosis targets are torque sensor 24A and torque sensor 24C, and torque sensor 24B and torque sensor 24D. As diagnosis signals, a signal TRQ-SIG-SM, a signal TRQ-TRG-MS, a signal TRQ-SIG-MM, a signal TRQ-SIG-MS, a signal TRQ-SIG-MS, a signal TRQ-SIG-MM, a signal TRQ-SIG-MS, a signal TRQ-TRG-MM, and a signal TRQ-SIG-SS are used. Furthermore, some of these signals are transferred between master CPU 37-1 and slave CPU 37-2 by LF-AST communication.

The redundant diagnoses can be performed in the same manner also when torque sensors are used in place of motor rotation angle sensors as has been described above.

Third Modified Example of Electronic Control Device

FIG. 23 is a block diagram showing a third modified example of the electronic control device according to the embodiment of the present invention, as applied to current sensors. The electronic control device can be applied to a case in which two types of current sensors 61, 62 are incorporated in a current monitor IC 60 and redundant diagnoses are performed to determine a failure of these current sensors.

A current is applied to current sensors 61, 62 from a terminal of an inspection target 63 through each of resistors 64 to 67 and monitored.

Capacitors 68 to 71 are noise-cutting capacitors that reduce fluctuations of current values.

Each of FIG. 24A and FIG. 24B is a diagram for describing the redundant diagnoses for determining a failure in the electronic control device of FIG. 23. As shown in FIG. 24A, each of a difference (constantly monitored) 1, a difference 2, a difference (constantly monitored) 3, and a difference 4 among monitor currents MON1, MON2-0, and MON2-1 is obtained. As shown in FIG. 24B, abnormality detection can be executed based on these differences.

Thus, the redundant diagnoses can be performed in the same manner also for current sensors in place of motor rotation angle sensors or torque sensors.

Here, technical ideas that can be grasped from the above-described embodiments will be described below along with their effects.

In one form, a control device of an electric power steering device according to the present invention includes a first sensor, a second sensor, and a third sensor that detect a physical quantity relating to a steering state, and an electric motor that applies a steering force to a steering wheel. The control device has an arithmetic processing device. The arithmetic processing device has: a first comparison unit that compares a difference between a first output signal output from the first sensor and a second output signal output from the second sensor with a first threshold value to determine a magnitude relationship, and compares a difference between the first output signal and a third output signal output from the third sensor with a second threshold value to determine a magnitude relationship; a first failure diagnosis unit that, based on a result of the first comparison unit, identifies one abnormal sensor among the first sensor, the second sensor, and the third sensor; and a first drive control unit that generates a drive control signal for driving the electric motor using output values from two normal sensors that are not identified as abnormal sensors among the first sensor, the second sensor, and the third sensor.

According to this configuration, an abnormal sensor can be identified without comparing the first output signal of the second sensor and the third output signal of the third sensor. Thus, the arithmetic processing time of the control device can be reduced and a load on the arithmetic processing device can be reduced accordingly.

The first to third sensors are mechanical sensors for control, for example, rotation angle sensors, steering angle sensors, torque sensors, or current sensors.

In a preferred form of the control device of an electric power steering device, the first sensor, the second sensor, and the third sensor are connected to the arithmetic processing device, and the arithmetic processing device has a sensor value input unit into which the first output signal, the second output signal, and the third output signal are input.

According to this configuration, the first to third sensors are directly connected to the arithmetic processing device, so that signals can be input in a short sampling time, allowing for early detection.

When the first sensor and the third sensor are digital sensors and the second sensor is an analog sensor, sensor value input units of the first sensor and the third sensor may include an A/D converter.

In another preferred form of the control device of an electric power steering device, the electric power steering device further includes a fourth sensor that detects a physical quantity relating to a steering state. The arithmetic processing device has: a second comparison unit that, based on a result of the first failure diagnosis unit, compares a difference between output signals output from the respective two normal sensors with a third threshold value to determine a magnitude relationship, and compares a difference between an output signal output from one of the two normal sensors and a fourth output signal output from the fourth sensor with a fourth threshold value to determine a magnitude relationship; a second failure diagnosis unit that, based on a result of the second comparison unit, identifies one abnormal sensor among the two normal sensors and the fourth sensor; and a second drive control unit that generates a drive control signal for driving the electric motor using output values from two sensors that are not identified as abnormal sensors among the two normal sensors and the fourth sensor.

According to this configuration, a secondary failure diagnosis can be made using two sensors that are found to be normal by a primary failure diagnosis and the fourth sensor. Thus, even in the event of a primary failure, three sensors are available to enable continuous control.

Like the first to third sensors, the fourth sensor is a mechanical sensor for control, for example, a rotation angle sensor, a steering angle sensor, a torque sensor, or a current sensor.

In yet another preferred form of the control device of an electric power steering device, the arithmetic processing device includes a first CPU and a second CPU. The first sensor, the second sensor, and the third sensor are connected to the first CPU, and the first CPU includes a first sensor value input unit into which the first output signal, the second output signal, and the third output signal are input, and a first inter-CPU communication unit for communicating with the second CPU. The first sensor, the third sensor, and the fourth sensor are connected to the second CPU, and the second CPU includes a second sensor value input unit into which the first output signal, the third output signal, and the fourth output signal are input, and a second inter-CPU communication unit for communicating with the first CPU. The first CPU acquires the fourth output signal through the first inter-CPU communication unit and the second inter-CPU communication unit.

According to the redundant configuration including a plurality of CPUs as described above, the plurality of CPUs can share wires and interfaces, so that the numbers of wires and interfaces can be minimized.

As with the first CPU, the second CPU acquires the output value from the second sensor by inter-CPU communication.

In a different preferred form of the control device of an electric power steering device, the first output signal and the third output signal are accompanied by time data at a time of output. The first CPU includes a memory unit that stores the first output signal, the second output signal, and the third output signal within a predetermined time. The first CPU acquires, from the memory unit, the first output signal, the second output signal, or the third output signal that dates back to a point a predetermined time before an acquisition timing at which the first inter-CPU communication unit has acquired the fourth output signal, and transfers the acquired output signal to the second comparison unit.

In this configuration, the signal of the fourth sensor corrects the lag between detection timings in inter-CPU communication and can thereby improve the abnormality determination accuracy.

Here, for example, digital sensors can be used as the first sensor and the third sensor, and analog sensors can be used as the second sensor and the fourth sensor. In this case, the sensor signal transmission method for the first sensor and the third sensor is SENT communication. The first and third sensor value input units may be provided with an A/D converter.

In a different preferred form of the control device of an electric power steering device, the arithmetic processing device includes a first CPU and a second CPU. The first sensor, the second sensor, the third sensor, and the fourth sensor are connected to the first CPU, and the first CPU has a first sensor value input unit into which the first output signal, the second output signal, the third output signal, and the fourth output signal are input. The first sensor, the second sensor, the third sensor, and the fourth sensor are connected to the second CPU, and the second CPU has a second sensor value input unit into which the first output signal, the second output signal, the third output signal, and the fourth output signal are input.

According to this configuration, the first to fourth sensors are directly connected to the first CPU and the first to fourth sensors are directly connected to the second CPU. Thus, the output value of the fourth sensor signal can be input in a short sampling time, allowing for early detection of an abnormality.

In a further different preferred form of the control device of an electric power steering device, the first sensor and the third sensor are digital sensors having an IC. The arithmetic processing device controls the electric motor using the first output signal until the first failure diagnosis unit identifies one abnormal sensor. The arithmetic processing device controls the electric motor using the third output signal when the first sensor is an abnormal sensor.

As described above, at least the first sensor is used as the control sensor and the second sensor and the third sensor are used as diagnosis sensors until a primary failure occurs. When the first sensor is identified as abnormal (after a primary failure), the main sensor on the slave side (third sensor) that is a digital sensor, and not the sub-sensor on the master side (second sensor), is used for control.

According to this configuration, since the first and third sensors are digital sensors, higher failure detection coverage can be achieved. Moreover, using a sensor with high failure detection coverage as the control sensor can prevent a situation in which the electric power steering device is controlled using a signal of a failed sensor while the failure remains undetected. In addition, even after a primary failure, the third sensor having high failure detection coverage can be used.

In another preferred form of the control device of an electric power steering device, the electric power steering device further includes: a magnet that is provided in a shaft of the electric motor and has N poles and S poles arrayed in a circumferential direction of a rotational axis of the shaft; and a substrate that is provided at an interval from the magnet in a direction of the rotational axis of the shaft, and has a first surface on a side of the magnet in the direction of the rotational axis of the shaft and a second surface on the opposite side from the magnet. The first sensor, the second sensor, the third sensor, and the fourth sensor are motor rotation angle sensors that detect a rotation angle of the electric motor. The first sensor and the third sensor are provided on the first surface, and the second sensor and the fourth sensor are provided on the second surface.

According to this configuration, a sensor having high detection accuracy is used as the control sensor and disposed at a position closer to the motor to thereby improve the detection accuracy.

In yet another preferred form of the control device of an electric power steering device, the second sensor and the fourth sensor are analog sensors having a narrower magnetism detection range than the first sensor and the third sensor.

According to this configuration, the detection accuracy can be improved by using a sensor suitable for the range of a magnetic field. Specifically, the second sensor and the fourth sensor that are analog sensors are provided on the second surface of the substrate. Compared with sensors on the first surface, the sensors on the second surface are disposed at positions where the lines of magnetic force are less dense. When the magnetism detection range is narrowed, a part in which the direction of the magnetic field is oblique is not detected, which can improve the detection accuracy.

In a preferred form of the control device of an electric power steering device, the first failure diagnosis unit has a determination unit, a confirmation unit, and an identification unit. The determination unit determines: a first abnormality detected state in which one of the first sensor and the second sensor is detected to be abnormal when a difference between the first output signal and the second output signal is greater than the first threshold value; a first no abnormality detected state in which no abnormality is detected when the difference between the first output signal and the second output signal is less than the first threshold value; a second abnormality detected state in which one of the first sensor and the third sensor is detected to be abnormal when a difference between the first output signal and the third output signal is greater than the second threshold value; and a second no abnormality detected state in which no abnormality is detected when the difference between the first output signal and the third output signal is less than the second threshold value. Based on a determination result of the determination unit, the confirmation unit confirms: a first abnormality confirmed state in which the first abnormality detected state is confirmed to be correct when the first abnormality detected state continues for a predetermined time; and a second abnormality confirmed state in which the second abnormality detected state is confirmed to be correct when the second abnormality detected state continues for a predetermined time. When at least one of the first abnormality confirmed state and the second abnormality confirmed state is confirmed, the identification unit identifies one abnormal sensor.

In this configuration, the determination unit detects an abnormality by performing failure detection, and the confirmation unit confirms an abnormality when the abnormality detected state continues for a predetermined time. When an abnormality is confirmed in at least one pair compared and an abnormality is detected in the other pair, the failed sensor is identified. Thus, an abnormality can be detected at an early point before an abnormality is confirmed by both the first abnormality confirmed state and the second abnormality confirmed state.

In another preferred form of the control device of an electric power steering device, the first output signal and the third output signal are accompanied by time data at a time of output. The arithmetic processing device includes a first CPU and a second CPU. The first CPU includes a first sensor value input unit. The second CPU includes a second sensor value input unit. The first sensor, the second sensor, and the third sensor are connected to the first sensor value input unit, and the first output signal, the second output signal, and the third output signal are input into the first sensor value input unit. The first sensor and the third sensor are connected to the second sensor value input unit, and the first output signal and the third output signal are input into the second sensor value input unit. The first CPU performs linear correction based on a difference between the time data of the first output signal and the time data of the third output signal such that a value of the first output signal or a value of the third output signal is approximated. The first CPU transfers the first output signal or the third output signal that has been corrected to the first comparison unit.

According to this configuration, signals that are detected at virtually close timings can be compared with each other, which allows for a more accurate failure diagnosis.

Here, the sensor signal transmission method is SENT communication, and a sensor output value is linearly corrected based on the lag between detection timings from sensor output values detected on a fixed cycle.

In yet another preferred form of the control device of an electric power steering device, the arithmetic processing device includes a first CPU and a second CPU. The first CPU includes a first inter-microcomputer communication unit and a first sensor value input unit. The second CPU includes a second inter-microcomputer communication unit and a second sensor value input unit. The first inter-microcomputer communication unit sends and receives data to and from the second inter-microcomputer communication unit. The first sensor, the second sensor, and the third sensor are connected to the first sensor value input unit, and the first output signal, the second output signal, and the third output signal are input into the first sensor value input unit. The second inter-microcomputer communication unit transmits an arithmetic operation cycle of the second CPU to the first CPU. The first sensor and the third sensor are connected to the second sensor value input unit, and the first output signal and the third output signal are input into the second sensor value input unit. The first CPU performs linear correction based on the arithmetic operation cycle of the second CPU acquired from the second inter-microcomputer communication unit and an arithmetic operation cycle of the first CPU such that a value of the first output signal or a value of the third output signal is approximated. The first CPU transfers the first output signal or the third output signal that has been corrected to the first comparison unit.

In this configuration, the arithmetic operation cycles of the CPUs are monitored to correct the lag between detection timings of the first output signal, the second output signal, or the third output signal based on the lag between the arithmetic operation cycles of the respective CPUs. Thus, when the lag between the arithmetic operation cycles of the respective CPUs can be determined, the lag between the detection timings can be learned, and the first output signal, the second output signal, or the third output signal can be corrected accordingly.

In yet another preferred form of the control device of an electric power steering device, the arithmetic processing device includes a first CPU and a second CPU. The first CPU includes a first trigger signal generation unit and a first trigger signal reception unit. The second CPU includes a second trigger signal generation unit. The first trigger signal generation unit generates a first trigger signal for causing the first sensor to output the first output signal, and the first trigger signal reception unit acquires a second trigger signal generated by the second trigger signal generation unit. The second trigger signal generation unit generates the second trigger signal for causing the third sensor to output the third output signal on a different cycle from the first trigger signal generation unit. The first CPU determines a lag between arithmetic operation cycles of the first CPU and the second CPU based on a difference between acquisition timings of the first trigger signal or the third trigger signal.

In this configuration, the lag between the detection timings of the first output signal, the second output signal, or the third output signal is corrected based on the lag between the arithmetic operation cycles of the respective CPUs. The lag between the arithmetic operation cycles of the respective CPUs is determined based on a trigger signal of SENT. Thus, it is possible to detect the lag between the arithmetic operation cycles without particularly informing the other CPU of the timing of synchronization of arithmetic operations.

In yet another preferred form of the control device of an electric power steering device, the first CPU performs linear correction based on a lag of the first trigger signal or the third trigger signal such that a value of the first output signal or a value of the third output signal is approximated. The first CPU transfers the first output signal or the third output signal that has been corrected to the first comparison unit.

According to this configuration, the output timings of the output signals of the sensors can be matched by correcting the lag between the output signals resulting from the lag between the arithmetic operation cycles of the CPUs.

In yet another preferred form of the control device of an electric power steering device, the first threshold value is greater than the second threshold value.

According to this configuration, the degree of certainty of failure detection can be improved.

In one form, an electric power steering device according to the present invention includes: a steering mechanism; a first sensor, a second sensor, and a third sensor that are provided in the steering mechanism and detect a physical quantity relating to a steering state; an electric motor that applies a steering force to a steering wheel through the steering mechanism; and a control device that controls the electric motor. The control device has: a first comparison unit that compares a difference between a first output signal output from the first sensor that detects the physical quantity relating to the steering state and a second output signal output from the second sensor that detects the physical quantity relating to the steering state with a first threshold value to determine a magnitude relationship, and compares a difference between the first output signal and a third output signal output from the third sensor that detects the physical quantity relating to the steering state with a second threshold value to determine a magnitude relationship; a first failure diagnosis unit that, based on a result of the first comparison unit, identifies one abnormal sensor among the first sensor, the second sensor, and the third sensor; and a first drive control unit that generates a drive control signal for driving the electric motor using output values from two normal sensors that are not identified as abnormal sensors among the first sensor, the second sensor, and the third sensor.

According to this configuration, an abnormal sensor can be identified without comparing the first output signal of the second sensor and the third output signal of the third sensor. Thus, the arithmetic processing time of the control device can be reduced and the load on the arithmetic processing device can be reduced accordingly.

The first to third sensors are mechanical sensors for control, for example, rotation angle sensors, steering angle sensors, torque sensors, or current sensors.

In one form, an electronic control device according to the present invention includes: a first comparison unit that compares a difference between a first output signal output from a first sensor and a second output signal output from a second sensor with a first threshold value to determine a magnitude relationship, and compares a difference between the first output signal and a third output signal output from a third sensor with a second threshold value to determine a magnitude relationship; a first failure diagnosis unit that, based on a result of the first comparison unit, identifies one abnormal sensor among the first sensor, the second sensor, and the third sensor; and a first drive control unit that generates a drive control signal for driving an electric motor using output values from two normal sensors that are not identified as abnormal sensors among the first sensor, the second sensor, and the third sensor.

According to this configuration, an abnormal sensor can be identified without comparing the first output signal of the second sensor and the third output signal of the third sensor. Thus, the arithmetic processing time of the control device can be reduced and the load on the arithmetic processing device can be reduced accordingly.

The first to third sensors are mechanical sensors for control, for example, rotation angle sensors, steering angle sensors, torque sensors, or current sensors.

As has been described above, according to the present invention, an electric power steering device, a control device of an electric power steering device, and an electronic control device that can easily examine sensors at times of normal operation and can easily identify the location of a failure in the event of a sensor failure can be obtained.

The configurations, the control methods, etc., described in the above embodiments have been schematically shown only to such an extent that the present invention can be understood and implemented. Therefore, the present invention is not limited to the described embodiments but can be altered into various forms without departing from the scope of the technical concept claimed in the claims.

REFERENCE SYMBOL LIST

1 CPU (master side)
2 CPU (slave side)
10 Arithmetic processing device
11 Electric power steering device
12 Steering mechanism
13 Steering assistance mechanism
31 Electric motor
32 Control device (ECU)
36 Motor rotation angle sensor
37 Arithmetic processing device
37-1 Master CPU
37-2 Slave CPU
41, 51 Trigger signal generation unit
42, 52 Trigger signal reception unit
43 Sensor value input unit 44 Correction processing unit
45 First failure diagnosis unit
46 Buffer (memory unit)
47, 57 Inter-CPU communication unit
48 Correction processing unit
49 Second failure diagnosis unit
A, B, C, D Sensor
36A, 36B, 36C, 36D Motor rotation angle sensor
Sa First output signal
Sb Second output signal
Sc Third output signal
Sd Fourth output signal
DI Control current

The invention claimed is:

1. A control device of an electric power steering device, the electric power steering device including a plurality of sensors, the plurality of sensors including a first sensor, a second sensor, and a third sensor to detect a first physical quantity relating to a steering state, a fourth sensor to detect a second physical quantity relating to the steering state, and an electric motor to apply a steering force to a steering wheel, wherein:
the control device has an arithmetic processor; and
the arithmetic processor is configured to perform:
a first comparison to compare a difference between a first output signal output from the first sensor and a second output signal output from the second sensor with a first threshold value to determine a magnitude relationship, and compare a difference between the first output signal and a third output signal output from the third sensor with a second threshold value to determine a magnitude relationship;
a first failure diagnosis to, based on a result of the first comparison, identify one abnormal sensor among the first sensor, the second sensor, and the third sensor;
a first drive control to generate a drive control signal for driving the electric motor using output values from two normal sensors that are not identified as abnormal sensors among the first sensor, the second sensor, and the third sensor,
a second comparison further to, based on the result of the first failure diagnosis, compare a difference between output signals output from the respective two normal sensors with a third threshold value to determine a magnitude relationship, and compare a difference between an output signal output from one of the two normal sensors and a fourth output signal output from the fourth sensor with a fourth threshold value to determine a magnitude relationship,
a second failure diagnosis to, based on a result of the second comparison, identify one abnormal sensor among the two normal sensors and the fourth sensor, and
a second drive control to generate the drive control signal for driving the electric motor using output values from two sensors that are not identified as abnormal sensors among the two normal sensors and the fourth sensor.

2. The control device of an electric power steering device according to claim 1, wherein the first sensor, the second sensor, and the third sensor are connected to the arithmetic processor, and the arithmetic processor is configured to receive, as input, the first output signal, the second output signal, and the third output signal.

3. The control device of an electric power steering device according to claim 1, wherein the first threshold value is greater than the second threshold value.

4. The control device of an electric power steering device according to claim 1, wherein:
the arithmetic processor includes a first CPU and a second CPU;
the first sensor, the second sensor, and the third sensor are connected to the first CPU, and the first CPU is configured to receive, as input, the first output signal, the second output signal, and the third output signal and the first CPU includes a first inter-CPU communication interface for communicating with the second CPU;
the first sensor, the third sensor, and the fourth sensor are connected to the second CPU, and the second CPU is configured to receive, as input, the first output signal, the third output signal, and the fourth output signal, and the second CPU includes a second inter-CPU communication interface for communicating with the first CPU; and
the first CPU is configured to acquire the fourth output signal through the first inter-CPU communication interface and the second inter-CPU communication interface.

5. The control device of an electric power steering device according to claim 4, wherein:
the first output signal and the third output signal are accompanied by time data at a time of output;
the first CPU includes a memory to store the first output signal, the second output signal, and the third output signal within a predetermined time; and
the first CPU is configured to acquire, from the memory, the first output signal, the second output signal, or the third output signal that dates back to a point a predetermined time before an acquisition timing at which the first inter-CPU communication interface has acquired the fourth output signal, and to transfer the acquired output signal to the arithmetic processor for the second comparison.

6. The control device of an electric power steering device according to claim 1, wherein:
the arithmetic processor includes a first CPU and a second CPU;
the first sensor, the second sensor, the third sensor, and the fourth sensor are connected to the first CPU, and the first CPU is configured to receive, as input, the first output signal, the second output signal, the third output signal, and the fourth output signal; and
the first sensor, the second sensor, the third sensor, and the fourth sensor are connected to the second CPU, and the second CPU is configured to receive, as input, the first output signal, the second output signal, the third output signal, and the fourth output signal.

7. The control device of an electric power steering device according to claim 1, wherein:
the first sensor and the third sensor are digital sensors having an IC;
the arithmetic processor is configured to control the electric motor using the first output signal until the first failure diagnosis identifies one abnormal sensor; and
the arithmetic processor is configured to control the electric motor using the third output signal when the first sensor is an abnormal sensor.

8. The control device of an electric power steering device according to claim 7, wherein:
the electric power steering device further includes:
a magnet that is provided in a shaft of the electric motor and has N poles and S poles arrayed in a circumferential direction of a rotational axis of the shaft; and a substrate that is provided at an interval from the magnet in a direction of the rotational axis of the shaft, and has a first surface on a side of the magnet in the direction of the rotational axis of the shaft and a second surface on an opposite side from the magnet;

the first sensor, the second sensor, the third sensor, and the fourth sensor are motor rotation angle sensors that detect a rotation angle of the electric motor;

the first sensor and the third sensor are provided on the first surface; and the second sensor and the fourth sensor are provided on the second surface.

9. The control device of an electric power steering device according to claim 1, wherein the second sensor and the fourth sensor are analog sensors having a narrower magnetism detection range than the first sensor and the third sensor.

10. The control device of an electric power steering device according to claim 1, wherein:
performing the first failure diagnosis includes performing a determination, a confirmation, and an identification;
performing the determination includes determining:
a first abnormality detected state in which one of the first sensor and the second sensor is detected to be abnormal when a difference between the first output signal and the second output signal is greater than the first threshold value;
a first no abnormality detected state in which no abnormality is detected when the difference between the first output signal and the second output signal is less than the first threshold value;
a second abnormality detected state in which one of the first sensor and the third sensor is detected to be abnormal when a difference between the first output signal and the third output signal is greater than the second threshold value; and
a second no abnormality detected state in which no abnormality is detected when the difference between the first output signal and the third output signal is less than the second threshold value;
performing the confirmation includes, based on a determination result of the determination, confirming:
a first abnormality confirmed state in which the first abnormality detected state is confirmed to be correct when the first abnormality detected state continues for a predetermined time; and
a second abnormality confirmed state in which the second abnormality detected state is confirmed to be correct when the second abnormality detected state continues for a predetermined time; and
performing the identification includes identifying, when at least one of the first abnormality confirmed state and the second abnormality confirmed state is confirmed, one abnormal sensor among the plurality of sensors.

11. The control device of an electric power steering device according to claim 1, wherein:
the first output signal and the third output signal are accompanied by time data at a time of output;
the arithmetic processor includes a first CPU and a second CPU;
the first CPU includes a first sensor value input;
the second CPU includes a second sensor value input;
the first sensor, the second sensor, and the third sensor are connected to the first sensor value input, and the first output signal, the second output signal, and the third output signal are input into the first sensor value input;

the first sensor and the third sensor are connected to the second sensor value input, and the first output signal and the third output signal are input into the second sensor value input;

the first CPU performs linear correction based on a difference between the time data of the first output signal and the time data of the third output signal such that a value of the first output signal or a value of the third output signal is approximated; and the first CPU transfers the first output signal or the third output signal that has been corrected to the arithmetic processor for the first comparison.

12. The control device of an electric power steering device according to claim 1, wherein:
the arithmetic processor includes a first CPU and a second CPU;
the first CPU includes a first inter-microcomputer communication interface and a first sensor value input;
the second CPU includes a second inter-microcomputer communication interface and a second sensor value input;
the first inter-microcomputer communication interface is configured to send and receive data to and from the second inter-microcomputer communication interface;
the first sensor, the second sensor, and the third sensor are connected to the first sensor value input, and the first output signal, the second output signal, and the third output signal are input into the first sensor value input;
the second inter-microcomputer communication interface is configured to transmit an arithmetic operation cycle of the second CPU to the first CPU;
the first sensor and the third sensor are connected to the second sensor value input, and the first output signal and the third output signal are input into the second sensor value input;
the first CPU is configured to perform linear correction based on the arithmetic operation cycle of the second CPU acquired from the second inter-microcomputer communication interface and an arithmetic operation cycle of the first CPU such that a value of the first output signal or a value of the third output signal is approximated; and
the first CPU is configured to transfer the first output signal or the third output signal that has been corrected to the arithmetic processor for the first comparison.

13. The control device of an electric power steering device according to claim 1, wherein:
the arithmetic processor includes a first CPU and a second CPU;
the first CPU is configured to perform a first trigger signal generation and a first trigger signal reception;
the second CPU is configured to perform a second trigger signal generation;
the first trigger signal generation includes generating a first trigger signal for causing the first sensor to output the first output signal, and the first trigger signal reception includes acquiring a second trigger signal generated by the second trigger signal generation;
the second trigger signal generation includes generating the second trigger signal for causing the third sensor to output the third output signal on a different cycle from the first trigger signal generation; and
the first CPU is configured to determine a lag between arithmetic operation cycles of the first CPU and the second CPU based on a difference between acquisition timings of the first trigger signal or the third trigger signal.

14. The control device of an electric power steering device according to claim 13, wherein:
- the first CPU is configured to perform linear correction based on a lag of the first trigger signal or the third trigger signal such that a value of the first output signal or a value of the third output signal is approximated; and
- the first CPU is configured to transfer the first output signal or the third output signal that has been corrected to the arithmetic processor for the first comparison.

15. An electric power steering device, comprising:
- a steering mechanism;
- a plurality of sensors including a first sensor, a second sensor, a third sensor provided in the steering mechanism and configured to detect a first physical quantity relating to a steering state, and a fourth sensor to detect a second physical quantity relating to the steering state;
- an electric motor configured to apply a steering force to a steering wheel through the steering mechanism; and
- a control device to control the electric motor and configured to perform:
  - a first comparison to compare a difference between a first output signal output from the first sensor that detects a third physical quantity relating to a steering state and a second output signal output from the second sensor that detects a fourth physical quantity relating to the steering state with a first threshold value to determine a magnitude relationship, and compare a difference between the first output signal and a third output signal output from the third sensor that detects the first physical quantity relating to the steering state with a second threshold value to determine a magnitude relationship;
  - a first failure diagnosis to, based on a result of the first comparison, identify one abnormal sensor among the first sensor, the second sensor, and the third sensor;
  - a first drive control to generate a drive control signal for driving the electric motor using output values from two normal sensors that are not identified as abnormal sensors among the first sensor, the second sensor, and the third sensor,
  - a second comparison further to, based on the result of the first failure diagnosis, compare a difference between output signals output from the respective two normal sensors with a third threshold value to determine a magnitude relationship, and compare a difference between an output signal output from one of the two normal sensors and a fourth output signal output from the fourth sensor with a fourth threshold value to determine a magnitude relationship,
  - a second failure diagnosis to, based on a result of the second comparison, identify one abnormal sensor among the two normal sensors and the fourth sensor, and
  - a second drive control to generate the drive control signal for driving the electric motor using output values from two sensors that are not identified as abnormal sensors among the two normal sensors and the fourth sensor.

16. An electronic control device, comprising:
at least one electronic control unit configured to:
- perform a first comparison to compare a difference between a first output signal output from a first sensor and a second output signal output from a second sensor with a first threshold value to determine a magnitude relationship, and to compare a difference between the first output signal and a third output signal output from a third sensor with a second threshold value to determine a magnitude relationship;
- perform a first failure diagnosis to, based on a result of the first comparison unit, identify one abnormal sensor among the first sensor, the second sensor, and the third sensor; and
- perform a first drive control to generate a drive control signal for driving an electric motor using output values from two normal sensors that are not identified as abnormal sensors among the first sensor, the second sensor, and the third sensor,
- perform a second comparison further to, based on the result of the first failure diagnosis, compare a difference between output signals output from the respective two normal sensors with a third threshold value to determine a magnitude relationship, and compare a difference between an output signal output from one of the two normal sensors and a fourth output signal output from the fourth sensor with a fourth threshold value to determine a magnitude relationship,
- perform a second failure diagnosis to, based on a result of the second comparison, identify one abnormal sensor among the two normal sensors and the fourth sensor, and
- perform a second drive control to generate the drive control signal for driving the electric motor using output values from two sensors that are not identified as abnormal sensors among the two normal sensors and the fourth sensor.

* * * * *